United States Patent
Larsson et al.

(10) Patent No.: US 10,165,593 B2
(45) Date of Patent: *Dec. 25, 2018

(54) NODE AND METHOD FOR DOWNLINK SCHEDULING AND HYBRID AUTOMATIC REPEAT REQUEST TIMING

(71) Applicant: Telefonaktiebolaget LM Ericsson (Publ), Stockholm (SE)

(72) Inventors: Daniel Larsson, Vallentuna (SE); Jung-Fu Cheng, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 119 days.

This patent is subject to a terminal disclaimer.

(21) Appl. No.: 15/061,510

(22) Filed: Mar. 4, 2016

(65) Prior Publication Data

US 2016/0192391 A1 Jun. 30, 2016

Related U.S. Application Data

(63) Continuation of application No. 14/239,454, filed as application No. PCT/SE2013/051209 on Oct. 16, 2013, now Pat. No. 9,319,211.

(Continued)

(51) Int. Cl.
*H04L 5/14* (2006.01)
*H04W 72/12* (2009.01)
(Continued)

(52) U.S. Cl.
CPC ....... *H04W 72/1289* (2013.01); *H04L 1/1812* (2013.01); *H04L 1/1893* (2013.01);
(Continued)

(58) Field of Classification Search
CPC .......... H04W 72/1289; H04W 72/0446; H04L 1/1812; H04L 1/1893; H04L 5/0055; H04L 5/14
See application file for complete search history.

(56) References Cited

U.S. PATENT DOCUMENTS

2014/0022960 A1* 1/2014 Fu ......................... H04W 24/02
370/280
2014/0029484 A1* 1/2014 Choi ..................... H04J 3/1694
370/280

(Continued)

FOREIGN PATENT DOCUMENTS

| CN | 102651680 A | 8/2012 |
| WO | 2012/124980 A2 | 9/2012 |
| WO | 2013025143 A1 | 2/2013 |

OTHER PUBLICATIONS

3GPP TSG RAN Meeting #74 (CA-based aspects for FDD-TDD joint operation—R1-133372).*

(Continued)

*Primary Examiner* — Lakeram Jangbahadur
(74) *Attorney, Agent, or Firm* — Christopher & Weisberg, P.A.

(57) ABSTRACT

Some of the example embodiments are directed towards a base station for determining a control timing configuration in order to provide a subframe timing setting for configuring downlink HARQ-ACK control timing for a cell serving a user equipment in a multiple cell communications network. The user equipment is served a TDD based cell and a FDD based cell. Some example embodiments are directed towards the user equipment the control timing configuration as discussed above.

20 Claims, 17 Drawing Sheets

Related U.S. Application Data

(60) Provisional application No. 61/869,084, filed on Aug. 23, 2013.

(51) Int. Cl.
  *H04L 1/18* (2006.01)
  *H04L 5/00* (2006.01)
  *H04W 72/04* (2009.01)

(52) U.S. Cl.
  CPC .............. *H04L 5/0055* (2013.01); *H04L 5/14* (2013.01); *H04W 72/0446* (2013.01)

(56) References Cited

U.S. PATENT DOCUMENTS

| | | | | |
|---|---|---|---|---|
| 2015/0003302 A1* | 1/2015 | Ekpenyong | ........... | H04W 72/14 370/280 |
| 2015/0003304 A1* | 1/2015 | Wu | ........... | H04L 1/1854 370/280 |
| 2015/0023228 A1* | 1/2015 | Yin | ........... | H04L 5/001 370/280 |
| 2015/0023229 A1* | 1/2015 | Yin | ........... | H04L 5/0032 370/280 |
| 2015/0043397 A1* | 2/2015 | Hsieh | ........... | H04L 1/1812 370/280 |

OTHER PUBLICATIONS

Office Action issued by the Office Office of the People's Republic of China dated Nov. 1, 2016, consisting of 5-pages including English translation.

International Search Report and Written Opinion dated Apr. 16, 2014 for International Application Serial No. PCT/SE2013/051209, International Filing Date: Oct. 16, 2013 consisting of 10-pages.

3GPP TSG-RAN WG1 #67, R1-114414, Source: Ericsson, St-Ericsson, Title: "On Support of Different TDD UL-DL Configurations on Different Bands", Agenda Item: 7.2.1.5, Document for Discussion and Decision, Location and Date of Conference: San Fransisco, CA USA, Nov. 21, 2011 consisting of 6-pages.

3GPP TS 36.213, V11.1.0 (Dec. 2012), "3rd Generation Partnership Project; Technical Specification Group Radio Access Network; Evolved Universal Terrestrial Radio Access (E-UTRA); Physical layer procedures (Release 11)", Dec. 20, 2012 consisting of 155-pages.

3GPP TSG-RAN WG1 #74, R1-133372, Source: LG Electronics, Title: "CA-Based Aspects for FDD-TDD Joint Operation", Agenda Item: 7.2.5, Document for Discussion, Location and Date of Conference: Barcelona, Spain, Aug. 19-23, 2013 consisting of 3-pages.

\* cited by examiner

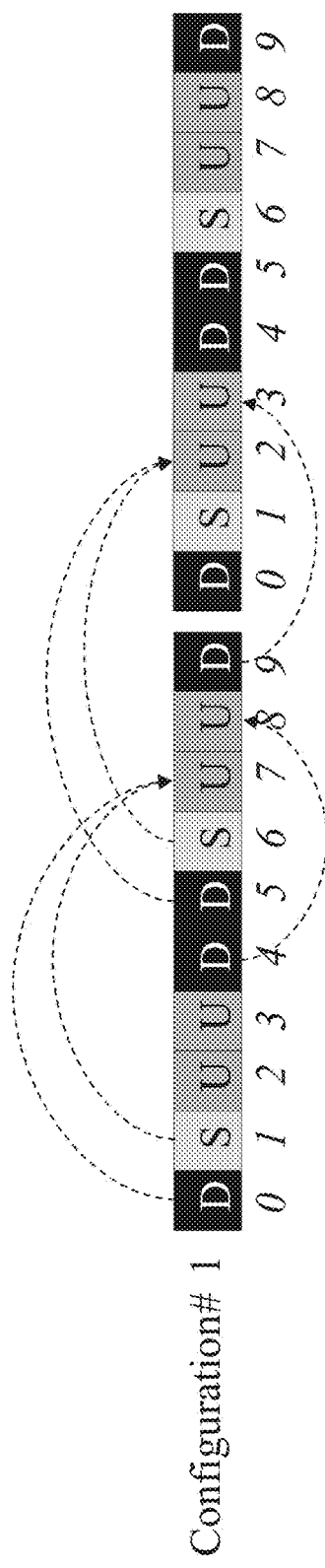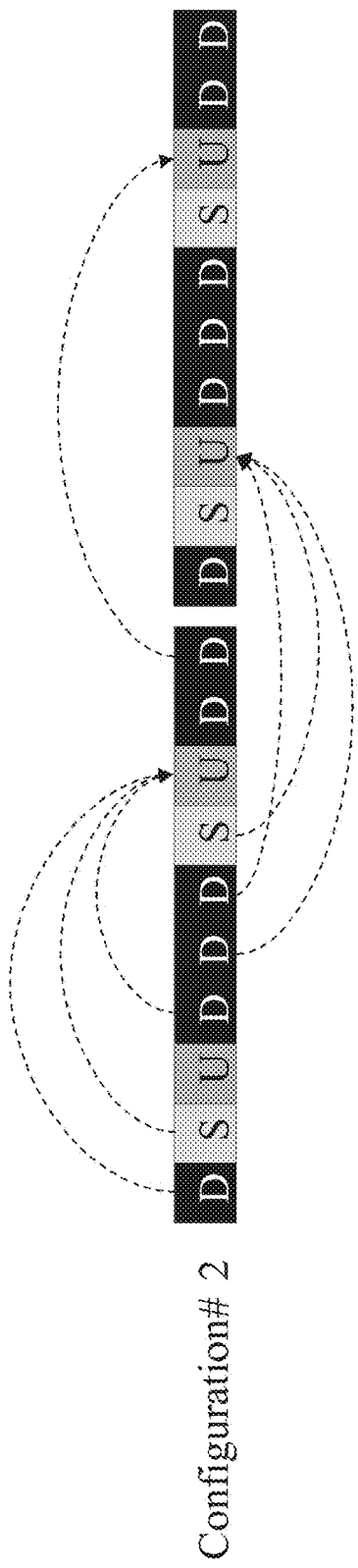
FIGURE 4A
FIGURE 4B

NODE AND METHOD FOR DOWNLINK SCHEDULING AND HYBRID AUTOMATIC REPEAT REQUEST TIMING

CROSS-REFERENCE TO RELATED APPLICATION

This application is a continuation of a U.S. National Stage patent application Ser. No. 14/239,454, filed Feb. 18, 2015, entitled NODE AND METHOD FOR DOWNLINK SCHEDULING AND HYBRID AUTOMATIC REPEAT REQUEST TIMING, which claims priority to International Application Serial No. PCT/SE2013/051209, International filing date Oct. 16, 2013, which claims the benefit of U.S. Provisional Application Ser. No. 61/869,084, filed Aug. 23, 2013, the entirety of which each is incorporated herein by reference.

TECHNICAL FIELD

Some of the example embodiments presented herein are directed towards a base station and user equipment, as well as corresponding methods therein, for determining a control timing configuration to provide a subframe timing setting for configuring downlink HARQ-ACK control timing for a cell serving the user equipment in a multiple cell communications network

BACKGROUND

Long Term Evolution Systems

Long Term Evolution (LTE) uses Orthogonal Frequency Division Multiplexing (OFDM) in the downlink direction and a Discrete Fourier Transform (DFT)-spread OFDM in the uplink direction. The basic LTE downlink physical resource can thus be seen as a time-frequency grid, where each resource element corresponds to one OFDM subcarrier during one OFDM symbol interval. In the time domain, LTE downlink transmissions may be organized into radio frames of 10 ms, with each radio frame consisting of ten equally-sized subframes of length Tsubframe=1 ms.

Furthermore, the resource allocation in LTE is typically described in terms of resource blocks, where a resource block corresponds to one slot, e.g., 0.5 ms, in the time domain and 12 subcarriers in the frequency domain. A pair of two adjacent resource blocks in time direction, e.g., 1.0 ms, is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a user equipment is made in terms of VRB pairs. There are two types of resource allocations, localized and distributed. In the localized resource allocation, a VRB pair is directly mapped to a PRB pair, hence two consecutive and localized VRBs are also placed as consecutive PRBs in the frequency domain. On the other hand, the distributed VRBs are not mapped to consecutive PRBs in the frequency domain, thereby providing frequency diversity for data channel transmitted using these distributed VRBs.

Downlink transmissions are dynamically scheduled, i.e., in each subframe the base station transmits control information regarding which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, e.g., the control information.

From LTE Release 11 and onwards, the above described resource assignments may also be scheduled on the enhanced Physical Downlink Control Channel (EPDCCH). For 3GPP Release 8 to 3GPP Release 10, only Physical Downlink Control Channel (PDCCH) is available.

PDCCH

The PDCCH is used to carry downlink control information (DCI) such as scheduling decisions and power-control commands. More specifically, the DCI comprises downlink scheduling assignments, including PDSCH resource indication, transport format, hybrid-ARQ information, and control information related to spatial multiplexing, if applicable. A downlink scheduling assignment also includes a command for power control of the PUCCH used for transmission of hybrid-ARQ acknowledgements in response to downlink scheduling assignments.

The DCI further comprises uplink scheduling grants, including PUSCH resource indication, transport format, and hybrid-ARQ-related information. An uplink scheduling grant also includes a command for power control of the PUSCH. The DCI further comprises power-control commands for a set of terminals as a complement to the commands included in the scheduling assignments/grants.

One PDCCH carries one DCI message with one of the formats above. As multiple terminals may be scheduled simultaneously, on both downlink and uplink, there must be a possibility to transmit multiple scheduling messages within each subframe. Each scheduling message is transmitted on a separate PDCCH, and consequently there are typically multiple and simultaneous PDCCH transmissions within each cell. Furthermore, to support different radio-channel conditions, link adaptation may be used, where the code rate of the PDCCH is selected to match the radio-channel conditions.

To allow for simple yet efficient processing of the control channels in the terminal, the mapping of PDCCHs to resource elements is subject to a certain structure. This structure is based on Control-Channel Elements (CCEs), which consists of nine REGs. The number of CCEs, one, two, four, or eight, required for a certain PDCCH depends on the payload size of the control information (DCI payload) and the channel-coding rate. This is used to realize link adaptation for the PDCCH; if the channel conditions for the terminal to which the PDCCH is intended are disadvantageous, a larger number of CCEs is used compared to the case of advantageous channel conditions. The number of CCEs used for a PDCCH is also referred to as the aggregation level (AL).

The network may then select different aggregation levels and PDCCH positions for different user equipments from the available PDCCH resources. For each PDCCH, a CRC is attached to each DCI message payload. The identity of the terminal (or terminals) addressed, e.g., the RNTI, is provided in the CRC calculation and not explicitly transmitted. Depending on the purpose of the DCI message, for example, unicast data transmission, power-control command, random-access response, etc., different RNTIs are used. For normal unicast data transmission, the terminal-specific C-RNTI is used.

After CRC attachment, the bits are coded with a rate-1/3 tail-biting convolutional code and rate matched to fit the amount of resources used for PDCCH transmission. After the PDCCHs to be transmitted in a given subframe have been allocated to the desired resource elements, the sequence of bits corresponding to all the PDCCH resource elements to be transmitted in the subframe, including the unused resource elements, is scrambled by a cell and subframe specific scrambling sequence to randomize inter-cell interference. Such scrambling is followed by QPSK modulation and mapping to resource elements. The entire collection of the REGs, including those unused by any PDCCH, is then interleaved across entire control region to randomize inter-cell interference as well as capturing frequency diversity for the PDCCHs.

PUCCH

If the mobile terminal has not been assigned an uplink resource for data transmission, the L1/L2 control information, e.g., channel-status reports, hybrid-ARQ acknowledgments, and scheduling requests, is transmitted in uplink resources, e.g., resource blocks, specifically assigned for uplink L1/L2 control on 3GPP Release 8 PUCCH. These resources are located at the edges of the total available cell bandwidth. Each such resource consists of 12 "subcarriers", e.g., one resource block, within each of the two slots of an uplink subframe. In order to provide frequency diversity, these frequency resources are frequency hopping on the slot boundary, i.e., one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g., in case of very large overall transmission bandwidth supporting a large number of users, additional resources blocks can be assigned next to the previously assigned resource blocks.

Carrier Aggregation

The LTE Release 10 standard has recently been standardized, supporting bandwidths larger than 20 MHz. One important requirement on LTE Release 10 is to assure backward compatibility with LTE Release 8. This should also include spectrum compatibility. That would imply that an LTE Release 10 carrier, wider than 20 MHz, should appear as a number of LTE carriers to an LTE Release 8 terminal. Each such carrier may be referred to as a Component Carrier (CC). In particular for early LTE Release 10 deployments it may be expected that there will be a smaller number of LTE Release 10 capable terminals compared to many LTE legacy terminals. Therefore, it is necessary to assure an efficient use of a wide carrier also for legacy terminals, i.e., that it is possible to implement carriers where legacy terminals may be scheduled in all parts of the wideband LTE Release 10 carrier. The straightforward way to obtain this would be by means of Carrier Aggregation (CA). CA implies that an LTE Release 10 terminal may receive multiple CC, where the CC have, or at least the possibility to have, the same structure as a Release 8 carrier.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

During initial access a LTE Release 10 terminal behaves similar to a LTE Release 8 terminal. Upon successful connection to the network a terminal may, depending on its own capabilities and the network, be configured with additional CCs in the UL and DL. Configuration is based on RRC. Due to the heavy signaling and rather slow speed of RRC signaling, it is envisioned that a terminal may be configured with multiple CCs even though not all of them are currently used. If a terminal is configured on multiple CCs this would imply it has to monitor all DL CCs for PDCCH and PDSCH. This implies a wider receiver bandwidth, higher sampling rates, etc., resulting in high power consumption.

To mitigate the above problems, LTE Release 10 supports activation of CCs on top of configuration. The terminal monitors only configured and activated CCs for PDCCH and PDSCH. Since activation is based on Medium Access Control (MAC) control elements, which are faster than RRC signaling, activation/de-activation may follow the number of CCs that are required to fulfill the current data rate needs. Upon arrival of large data amounts multiple CCs are activated, used for data transmission, and de-activated if not needed anymore. All but one CC, the DL Primary CC (DL PCC), may be de-activated. Activation provides therefore the possibility to configure multiple CC but only activate them on a need basis. Most of the time a terminal would have one or very few CCs activated resulting in a lower reception bandwidth and thus battery consumption.

Scheduling of a CC is done on the PDCCH via downlink assignments. Control information on the PDCCH is formatted as a Downlink Control Information (DCI) message. In Release 8 a terminal only operates with one DL and one UL CC, the association between DL assignment, UL grants and the corresponding DL and UL CCs is therefore clear. In LTE Release 10 two modes of CA needs to be distinguished. The first case is very similar to the operation of multiple Release 8 terminals, a DL assignment or UL grant contained in a DCI message transmitted on a CC is either valid for the DL CC itself or for associated (either via cell-specific or UE specific linking) UL CC. A second mode of operation augments a DCI message with the Carrier Indicator Field (CIF). A DCI containing a DL assignment with CIF is valid for that DL CC indicted with CIF and a DCI containing an UL grant with CIF is valid for the indicated UL CC.

DCI messages for downlink assignments contain among others resource block assignment, modulation and coding scheme related parameters, HARQ redundancy version, etc. In addition to those parameters that relate to the actual downlink transmission most DCI formats for downlink assignments also contain a bit field for Transmit Power Control (TPC) commands. These TPC commands are used to control the uplink power control behavior of the corresponding PUCCH that is used to transmit the HARQ feedback.

In LTE Release 10, the transmission of PUCCH is mapped onto one specific uplink CC, the UL Primary CC (UL PCC). Terminals only configured with a single DL CC, which is then the DL PCC, and UL CC, which is then the UL PCC, are operating dynamic ACK/NACK on PUCCH according to 3GPP Release 8. The first Control Channel Element (CCE) used to transmit PDCCH for the DL assignment determines the dynamic ACK/NACK resource on 3GPP Release 8 PUCCH. Since only one DL CC is cell-specifically linked with the UL PCC no PUCCH collisions may occur since all PDCCH are transmitted using different first CCE.

Upon reception of DL assignments on a single Secondary CC (SCC) or reception of multiple DL assignments, a PUCCH format (which is referred to as CA PUCCH herein)

that can carry the HARQ-ACK of multiple serving cells should be used. A DL SCC assignment alone is untypical. The eNB scheduler should strive to schedule a single DL CC assignment on the DL PCC and try to de-activate SCCs if not needed. A possible scenario that may occur is that eNB schedules terminal on multiple DL CCs including the PCC. If the terminal misses all but the DL PCC assignment it will use Release 8 PUCCH instead of CA PUCCH. To detect this error case eNB has to monitor both the Release 8 PUCCH and the CA PUCCH.

In LTE Release 10, the CA PUCCH format is based on the number of configured CC. Configuration of CC is based on RRC signaling. After successful reception/application of the new configuration a confirmation message is sent back making RRC signaling very safe.

CA PUCCH Transmission Scheme

In this application, CA PUCCH refers to means of transmitting HARQ-ACK of multiple serving cells in the UL. For Rel-10 LTE, CA PUCCH can be embodied in one of the following two approaches. The first method is based on the use of PUCCH format 3 that is based on DFTS-OFDM. The multiple ACK/NACK bits are encoded to form 48 coded bits. The coded bits are then scrambled with cell-specific (and possibly DFTS-OFDM symbol dependent) sequences. 24 bits are transmitted within the first slot and the other 24 bits are transmitted within the second slot. The 24 bits per slot are converted into 12 QPSK symbols, DFT precoded, spread across five DFTS-OFDM symbols and transmitted within one resource blocks (bandwidth) and five DFTS-OFDM symbols (time). The spreading sequence is user equipment specific and enables multiplexing of up to five users within the same resource blocks. For the reference signals cyclic shifted CAZAC sequences, e.g., computer optimized sequences, may be used.

The second CA PUCCH method is called channel selection. The basic principle is that the user equipment is assigned a set of PUCCH format 1a/1b resources. The user equipment then selects one of resources according to the ACK/NACK sequence the user equipment should transmit. On one of the assigned resources, the user equipment would then transmit a QPSK or BPSK. The eNB detects which resource the user equipment used and which QPSK or BPSK value the user equipment fed back on the used resource and combines this into a HARQ response for associated DL cells. A similar type of mapping including a bundling approach is also done for TDD as in the FDD, in case the user equipment is configured with channel selection.

Time Division Duplex

Transmission and reception from a node, e.g., a terminal or user equipment 501 and base station 401 in a cellular system such as LTE, may be multiplexed in the frequency domain or in the time domain (or combinations thereof). Frequency Division Duplex (FDD) as illustrated to the left in FIG. 1 implies that downlink and uplink transmission take place in different, sufficiently separated, frequency bands. Time Division Duplex (TDD), as illustrated to the right in FIG. 1, implies that downlink and uplink transmission take place in different, non-overlapping time slots. Thus, TDD can operate in unpaired spectrum, whereas FDD requires paired spectrum.

Typically, the structure of the transmitted signal in a communication system is organized in the form of a frame structure. For example, LTE uses ten equally-sized subframes of length 1 ms per radio frame as illustrated in FIG. 2.

In case of FDD operation, illustrated in the upper section of FIG. 2, there are two carrier frequencies, one for uplink transmission (fUL) and one for downlink transmission (fDL). At least with respect to the terminal in a cellular communication system, FDD may be either full duplex or half duplex. In the full duplex case, a terminal may transmit and receive simultaneously, while in half-duplex operation, the terminal may not transmit and receive simultaneously. The base station is capable of simultaneous reception/transmission though, e.g., receiving from one terminal while simultaneously transmitting to another terminal. In LTE, a half-duplex terminal is monitoring/receiving in the downlink except when explicitly being instructed to transmit in a certain subframe.

In case of TDD operation, illustrated in the lower section of FIG. 2, there is only a single carrier frequency and uplink and downlink transmissions are always separated in time also on a cell basis. As the same carrier frequency is used for uplink and downlink transmission, both the base station and the mobile terminals need to switch from transmission to reception and vice versa. An essential aspect of any TDD system is to provide the possibility for a sufficiently large guard time where neither downlink nor uplink transmissions occur. This is required to avoid interference between uplink and downlink transmissions. For LTE, this guard time is provided by special subframes, e.g., subframe 1 and, in some cases, subframe 6, which are split into three parts: a downlink part (DwPTS), a guard period (GP), and an uplink part (UpPTS). The remaining subframes are either allocated to uplink or downlink transmission.

TDD allows for different asymmetries in terms of the amount of resources allocated for uplink and downlink transmission, respectively, by means of different downlink/uplink configurations. In LTE, there are seven different configurations as shown in FIG. 3. It should be appreciated that a DL subframe may mean either DL or the special subframe.

To avoid severe interference between downlink and uplink transmissions between different cells, neighbor cells should have the same downlink/uplink configuration. If this is not done, uplink transmission in one cell may interfere with downlink transmission in the neighboring cell and vice versa. Hence, the downlink/uplink asymmetry may typically not vary between cells, but is signaled as part of the system information and remains fixed for a long period of time.

TDD HARQ Control Timing

The timings for HARQ A/N feedbacks for the PDSCH are specified with extensive tables and procedure descriptions for each U/D configuration in Table 1. The user equipment shall also feedback PDSCH decoding A/N information in pre-defined UL subframes. The user equipment shall transmit such HARQ A/N responses on the PUCCH in UL subframe n if there is PDSCH transmission indicated by the detection of corresponding PDCCH or there is PDCCH indicating downlink SPS release within subframe(s) n−k, where k is within the association set $K=\{k_0, k_1, \ldots, k_{M-1}\}$ listed in Table 1.

TABLE 1

| Downlink association set index K = {k₀, k₁, . . . , k_{M−1}} for TDD | | | | | | | | | | |
|---|---|---|---|---|---|---|---|---|---|---|
| UL-DL | Subframe n | | | | | | | | | |
| Configuration | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

Examples to illustrate the timing are in reference to FIG. 4A. It should be appreciated that the leftmost subframe is denoted as subframe 0 and the rightmost subframe is denoted as subframe 9. The subframe numbers have been provided in FIG. 4A for the purpose of explanation. For the UL subframe 7 in the configuration 1 cell, Table 1 shows K={7,6}, which corresponds to carrying possible HARQ A/N feedbacks for PDSCHs transmitted in subframes 7−7=0 and 7−6=1 (n−k). This is illustrated as arrows originating from DL subframes 0 and 1, being directed towards the UL subframe 7 in FIG. 4A, Configuration #1.

Similarly, for the UL subframe 2 in the configuration 2 cell, as illustrated in FIG. 4B, Table 1 shows K={8, 7, 4, 6}, which corresponding to carrying possible HARQ A/N feedbacks for PDSCHs transmitted in subframes 4, 5, 6, and 8 of the preceding frame. This is illustrated as arrows originating from these DL subframes are directed towards the UL subframe 2 in FIG. 4B, Configuration #2. It should be appreciated that in the examples provided herein, the n−k calculation is a modular 10 calculation.

SUMMARY

In current 3GPP standards, the possibility of a user equipment being served by an aggregated FDD and TDD carrier simultaneously is not discussed or addressed. Thus, at least one example object of the example embodiments presented herein is to provide mechanisms to implement downlink scheduling and HARQ control timing for a FDD and TDD carrier aggregated network.

Therefore, some of the example embodiments presented herein are directed towards how to allocate the HARQ timing and scheduling timing for PDSCH transmission, for example, DL HARQ. According to some of the example embodiments, depending on which if either FDD or a certain UL/DL configuration for TDD is used, an applicable reference configuration is selected for the HARQ timing. An advantage of the example embodiments is the ability to provide a simple scheme to derive the subframes for the timing of HARQ and scheduling for TDD and FDD aggregation.

Accordingly, some of the example embodiments are directed towards a method, in a base station, for determining a control timing configuration. The control timing configuration provides a subframe timing setting for configuring downlink HARQ-ACK control timing for a cell serving a user equipment in a multiple cell communications network. The user equipment is served by a TDD based cell and a FDD based cell.

The method comprises determining a control timing configuration for a secondary cell. The secondary cell is one of the TDD based cell or the FDD based cell. The determining of the control timing configuration is based on a control timing configuration of a primary cell. The primary cell is one of the FDD based cell or the TDD based cell, respectively. The method further comprises implementing the control timing configuration for downlink HARQ-ACK control timing for a cell serving the user equipment.

Some of the example embodiments are directed towards a base station for determining a control timing configuration. The control timing configuration provides a subframe timing setting for configuring downlink HARQ-ACK control timing for a cell serving a user equipment in a multiple cell communications network. The user equipment is served by a TDD based cell and a FDD based cell.

The base station comprises processing circuitry configured to determine a control timing configuration for a secondary cell. The secondary cell is one of the TDD based cell or the FDD based cell. The processing circuitry is configured to determine the control timing configuration based on a control timing configuration of a primary cell. The primary cell is one of the FDD based cell or the TDD based cell, respectively. The processing circuitry is further configured to implement the control timing configuration for downlink HARQ-ACK control timing for a cell serving the user equipment.

Some of the example embodiments are directed towards a method, in a user equipment, for determining a control timing configuration. The control timing configuration provides a subframe timing setting for configuring downlink HARQ-ACK control timing for a cell serving the user equipment in a multiple cell communications network. The user equipment is served by a TDD based cell and a FDD based cell.

The method comprises determining a control timing configuration for a secondary cell. The secondary cell is one of the TDD based cell or the FDD based cell. The determining is based on a control timing configuration of a primary cell. The primary cell is one of the FDD based cell or the TDD based cell, respectively. The method further comprises implementing the control timing configuration for downlink HARQ-ACK control timing for a cell serving the user equipment.

Some of the example embodiments are directed towards a user equipment for determining a control timing configuration. The control timing configuration provides a subframe timing setting for configuring downlink HARQ-ACK control timing for a cell serving the user equipment in a multiple cell communications network. The user equipment is served by a TDD based cell and a FDD based cell.

The user equipment comprises processing circuitry configured to determine a control timing configuration for a secondary cell. The secondary cell is one of the TDD based cell or the FDD based cell. The determination of the control timing configuration is based on a control timing configuration of a primary cell. The primary cell is one of the FDD based cell or the TDD based cell, respectively. The processing circuitry is further configured to implement the control timing configuration for downlink HARQ-ACK control timing for a cell serving the user equipment.

Definitions

ACK Acknowledgement
AL Aggregation Level
ARQ Automatic Repeat reQuest
BPSK Binary Phase Shift Keying
C-RNTI Cell Radio Network Temporary Identifier
CA Carrier Aggregation
CAZAC Constant Amplitude Zero Autocorrelation
CC Component Carrier
CCE Control-Channel Elements
CFI Control Format Indicator
CIF Carrier Indicator Field
CRC Cyclic Redundancy Check
DCI Downlink Control Information
DFT Discrete Fourier Transform
DFTS DFT Spread
DL Downlink
DTX Discontinuous Transmission
DwPTS Downlink Part of a Special Subframe
ePDCCH enhanced Physical Downlink Control Channel
GP Guard Period
FDD Frequency Division Duplexing
HARQ Hybrid Automatic Repeat Request
LTE Long Term Evolution
MAC Medium Access Control
NACK Non-Acknowledgement
NW Network
OFDM Orthogonal Frequency Division Multiplexing
PCell Primary Cell
PCC Primary CC
PDCCH Physical Downlink Control Channel
PDSCH Physical Downlink Shared Channel
PRB Physical Resource Blocks
PUCCH Physical Uplink Control Channel
PUSCH Physical Uplink Shared Channel
QPSK Quadrature Phase Shift Keying
REG Resource Element Group
RNTI Radio Network Temporary Identifier
RRC Radio Resource Control
SCell Secondary Cell
SCC Secondary CC
TDD Time Division Duplexing
TPC Transmit Power Control
UE User Equipment
UL Uplink
UpPTS Uplink Part of a Special Subframe
VRB Virtual Resource Blocks

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 4A and 4B are illustrative examples of PDSCH A/N feedback timings.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

As part of the development of the example embodiments presented herein, a problem will first be identified and discussed.

Interband TDD carrier aggregation with different UL-DL configurations on different carrier.

In LTE Release 10, carrier aggregation of TDD cells is specified with the restriction that the U/D configurations for all the aggregated cells are identical. The need to allow more flexible carrier aggregation of TDD cells is to be addressed in Release 11 of LTE.

The U/D configurations of neighboring cells need to be compatible to avoid severe interference problems. However, there are cases where the neighboring cells are operated by different operators or different wireless systems. The LTE TDD cells adjacent to those neighboring systems are hence required to adopt certain compatible U/D configurations. As a result, an operator may have several TDD cells having different U/D configurations on different frequencies.

To solve the HARQ control and A/N feedback timings in carrier aggregation systems with cells of different UL-DL configurations, WO2013/025143 and 3GPP TS 36.211 V11.1.0 3rd Generation Partnership Project; Technical Specification Group Radio Access Network; Evolved Universal Terrestrial Radio Access (E-UTRA); Physical channels and modulation (Release 11), taught that a user equipment is configured with at least one of two timing configuration numbers. The first timing configuration number is a PDSCH HARQ control timing configuration number for determining PDSCH HARQ A/N timings across all aggregated cells. The second timing configuration number is a PUSCH control timing configuration number for determining PUSCH scheduling and the corresponding HARQ A/N timings on PHICH across all aggregated cells.

Figure 1:
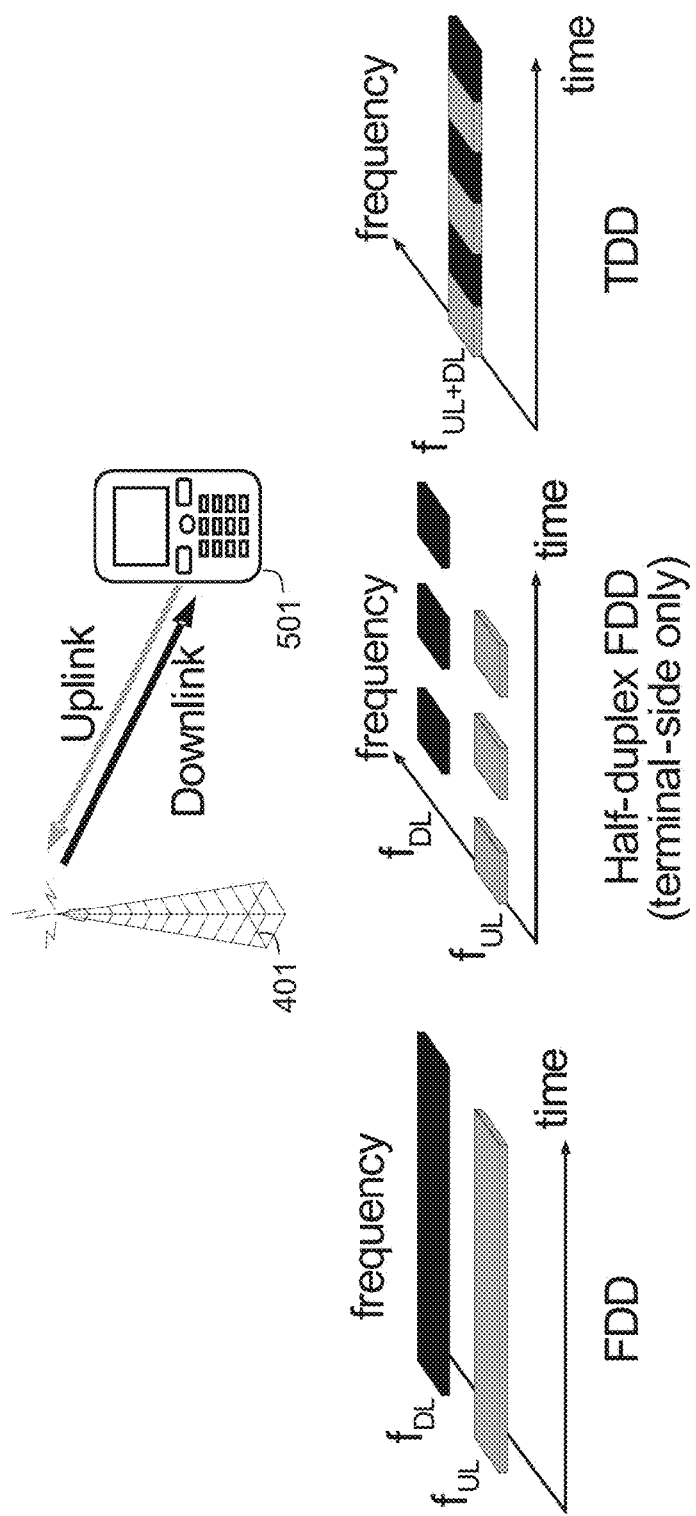
FIG. 1 is an illustrative example of frequency and time division duplex.
Figure 2:
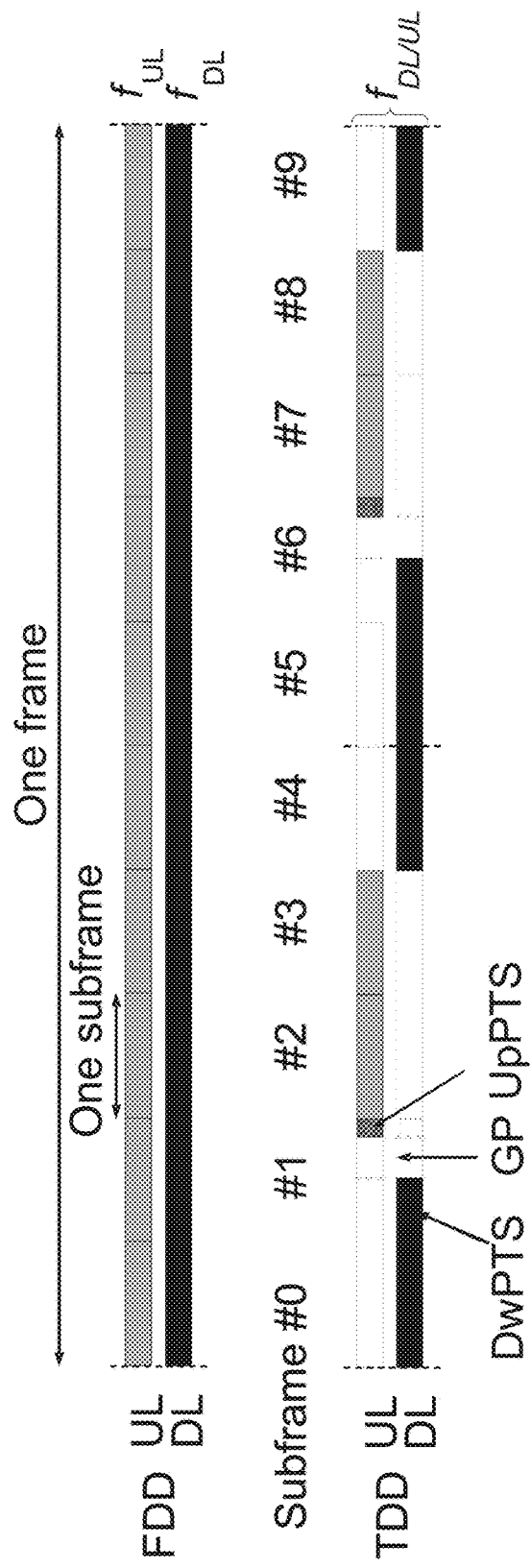
FIG. 2 is an illustrative example of an uplink/downlink time/frequency structure for LTE in the case of FDD and TDD.
Figure 3:
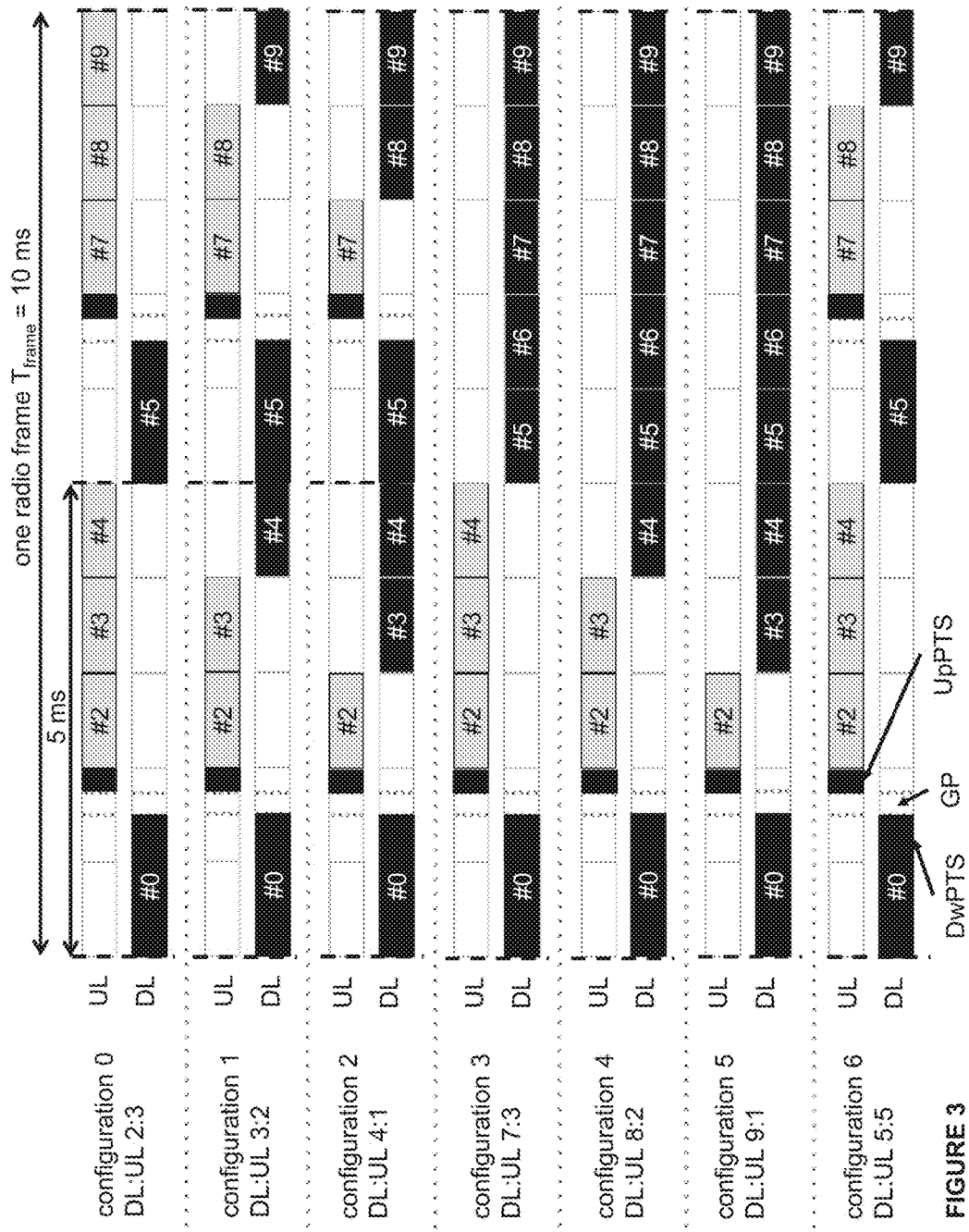
FIG. 3 is an illustrative example of the different uplink/downlink TDD configurations.
Figure 5:
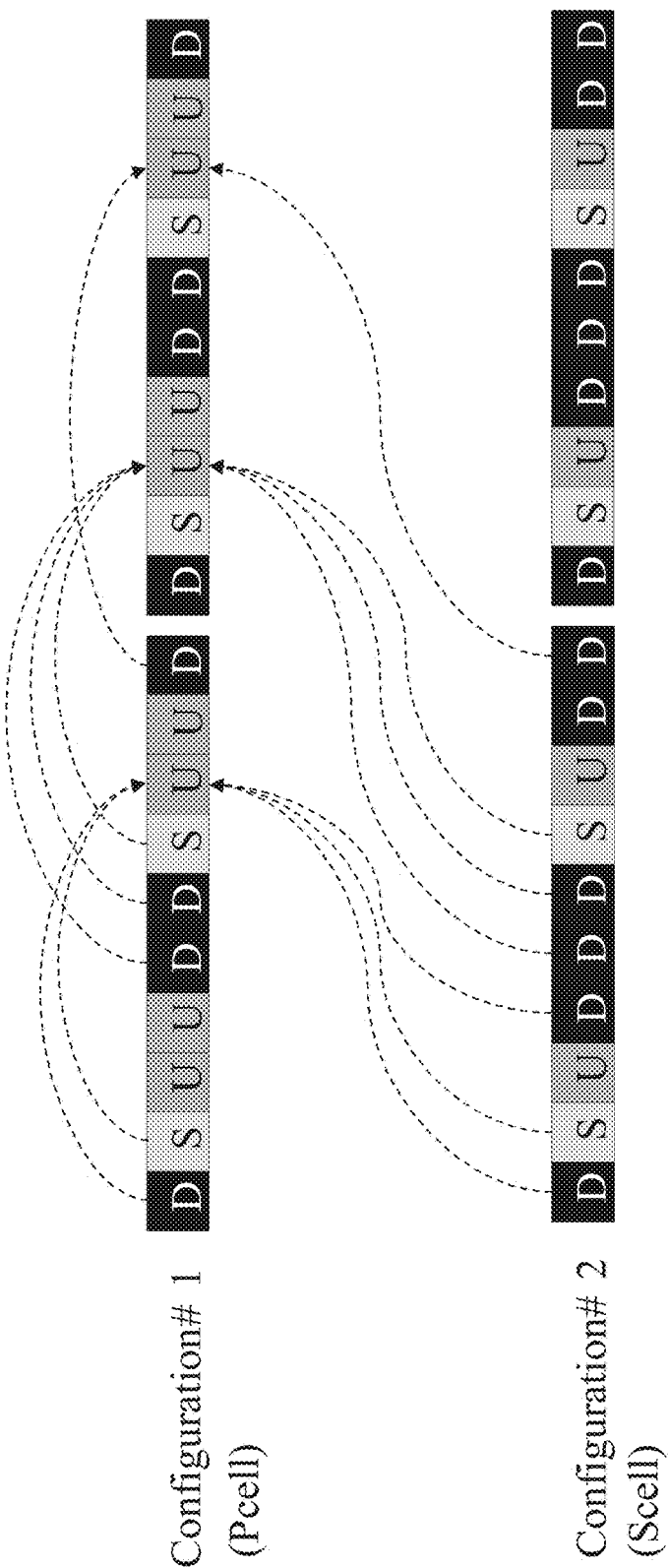
FIGS. 5 and 6 are illustrative examples of PDSCH A/N feedback timings for an aggregation of a configuration 1 cell and a configuration 2 cell.
Figure 6:
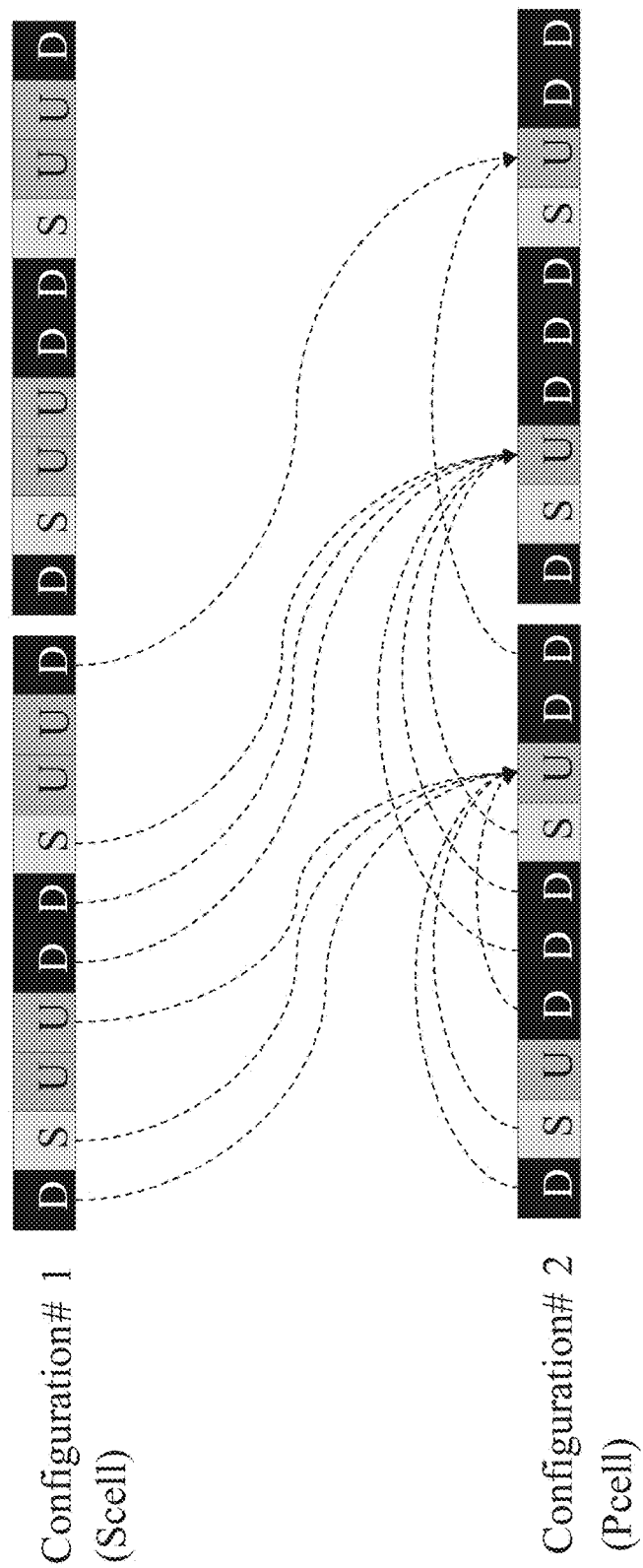

As an example to illustrate the mechanism discussed above, consider the PDSCH A/N feedback timing for a configuration 1 cell and a configuration 2 cell shown in FIG. 5. For a user equipment configured with these two serving cells, the DL HARQ control timing configuration number may be set to configuration number 2. Accordingly, as described in Table 1, configuration 2 provides for HARQ A/N feedback to be received in subframes 2 and 7. Utilizing the n−k calculation, it is determined that such HARQ A/N feedbacks are for PDSCHs transmitted in subframes 0, 1, 3, 4, 5, 6 and 9. As shown in FIG. 5, the topmost cell is denoted as the primary cell (PCell) and the bottommost cell is denoted as the secondary cell (SCell). As illustrated in FIG. 5, HARQ A/N feedbacks originating from the SCell are scheduled in the PCell. FIG. 6 illustrates a similar system as provided in FIG. 5. However, in FIG. 6, it is the bottom most cell which serves as the PCell.

Overview of the Example Embodiments

In current 3GPP standards, the possibility of a user equipment being served by an aggregated FDD and TDD carrier simultaneously is not discussed or addressed. Thus, at least one example object of the example embodiments presented herein is to provide mechanisms to provide downlink scheduling and HARQ control timing for FDD and TDD carrier aggregated network.

Therefore, some of the example embodiments presented herein are directed towards how to allocate the HARQ timing and scheduling timing for PDSCH transmission, for example, DL HARQ. According to some of the example embodiments, depending on which if either FDD or a certain UL/DL configuration for TDD is used, an applicable reference configuration is selected for the HARQ timing. An advantage of the example embodiments is the ability to provide a simple scheme to derive the subframes for the timing of HARQ and scheduling for TDD and FDD aggregation.

The applicable scheduling and HARQ timing for a user equipment performing aggregation between a FDD carrier and a TDD carrier depends on which of the carriers the scheduling is performed from. In addition, what impacts the applicable timings are whether the user equipment is configured with cross-carrier scheduling or not. The example embodiments are mostly described from the basis of only aggregation between two carriers although it is assumed that the aggregation may also be extended to more than two carriers.

In this section, the example embodiments will be illustrated in more detail by a number of examples. It should be noted that these examples are not mutually exclusive. Components from one example embodiment may be tacitly assumed to be present in another embodiment and a person skilled in the art may use any number of the example embodiments in other example embodiments.

The example embodiments will be presented as follows. First, example embodiments directed towards the self-scheduling of each individual cell serving a user equipment is provided under the subheading 'DL HARQ-ACK timing for self-scheduling'. In such example embodiments, scheduling of a secondary cell is provided based on a configuration (e.g., configuration number) or type (e.g., TDD or FDD) of a primary cell serving the user equipment. Some example embodiments are provided with the FDD based cell functioning as the primary cell. In such example embodiments, the TDD based cell therefore functions as the secondary cell. These example embodiments are discussed under the subheading 'FDD carrier as the PCell'.

Some example embodiments are provided where the TDD based cell functions as the primary cell and the FDD based cell therefore functions as the secondary cell, as discussed under the subheading 'TDD carrier as the PCell'. According to these example embodiments, scheduling of the secondary FDD cell may be based on a configuration of the TDD primary cell, as discussed under the subheading 'HARQ scheduling based on PCell configuration'. According to some of the example embodiments, the scheduling of the FDD secondary cell may be based on a subframe hierarchy as described under the subheading 'HARQ scheduling based on subframe hierarchy'. According to some of the example embodiments, the scheduling of the FDD secondary cell may be based on newly provided or altered configuration sets, as described under the subheadings 'HARQ scheduling based on association sets' and 'HARQ scheduling based on extended association sets'.

Example embodiments directed towards cross-carrier scheduling are also provided under the subheading 'DL HARQ-ACK timing for cross-carrier scheduling configuration'. Finally, example node configurations and example node operations are provided under the subheadings "Example node configuration" and "Example node operations", respectively.

DL HARQ-ACK Timing for Self-Scheduling Configuration

A self-scheduling configuration provides for the PDSCH scheduling information to be transmitted via the PDCCH/ePDCCH on each individual aggregated serving cell.

FDD Carrier as the PCell

According to some of the example embodiments, when the TDD based cell functions as the SCell, PDSCH HARQ feedback timing follows a new PDSCH HARQ timing reference configuration referred to as the UL/DL configuration number F, which is defined in the extended downlink association set in Table 2. The added configuration in Table 2 is denoted with bold and underlined text.

TABLE 2

| | Extended downlink association set index K = {$k_0, k_1, \ldots, k_{M-1}$} | | | | | | | | | |
|---|---|---|---|---|---|---|---|---|---|---|
| UL-DL | Subframe n | | | | | | | | | |
| Configuration | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |

TABLE 2-continued

Extended downlink association set index K = {k₀, k₁, . . . , k_{M-1}}

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |
| F | 4 | 4 | 4 | 4 | 4 | 4 | 4 | 4 | 4 | 4 |

Figure 7:
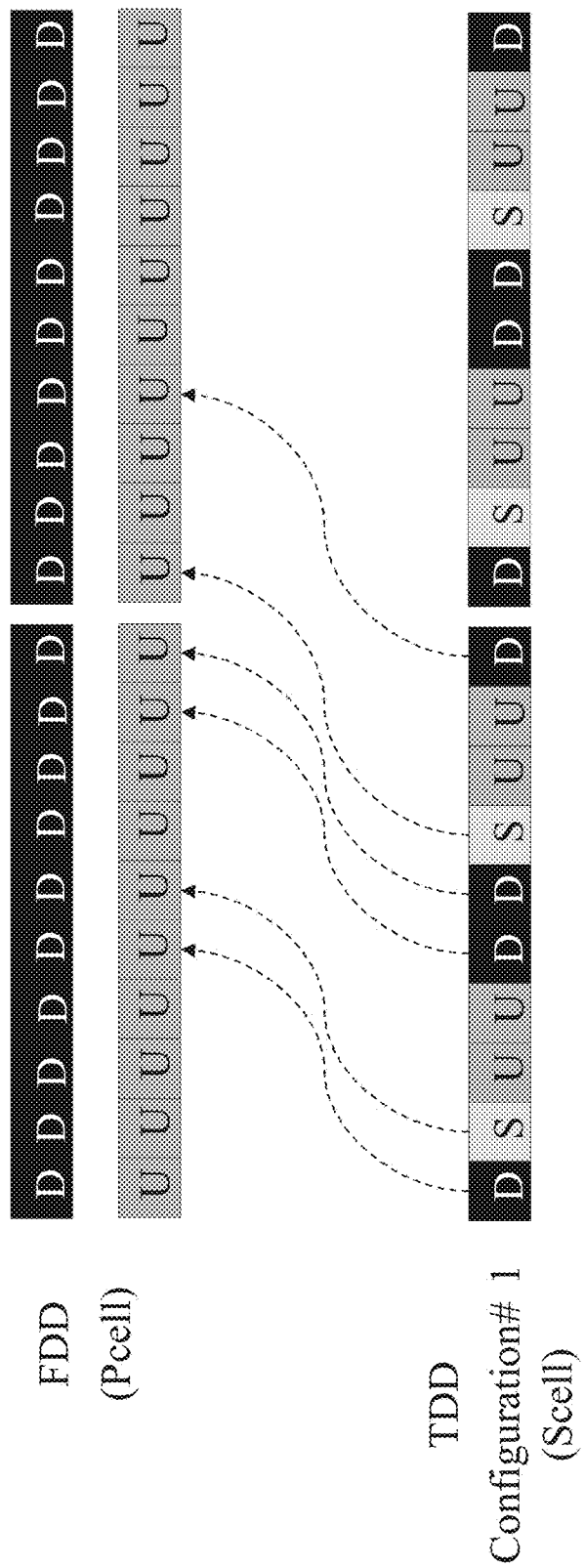
FIGS. 7 and 8 illustrate examples of control timing for FDD and TDD aggregated cells, according to some of the example embodiments.

An exemplary carrier aggregation case of a FDD PCell and a TDD configuration #1 SCell according to this embodiment is illustrated in FIG. 7. As illustrated in FIG. 7, all downlink subframes of the SCell are scheduled for HARQ feedback in the FDD based PCell according to the F configuration of Table 2. Specifically, each HARQ feedback in the FDD is provided for a n−k subframe of the TDD SCell, where k is four for each subframe.

TDD Carrier as the Pcell

HARQ Scheduling Based on PCell Configuration

According to some of the example embodiments, the FDD SCell uses the PCell UL/DL configuration as the timing reference configuration for DL HARQ feedback. Such example embodiments provide a simplified implementation. However, some DL subframes on the FDD SCell will not have associated HARQ feedback timing and hence may not be used for the carrier aggregation user equipment.

Figure 8:
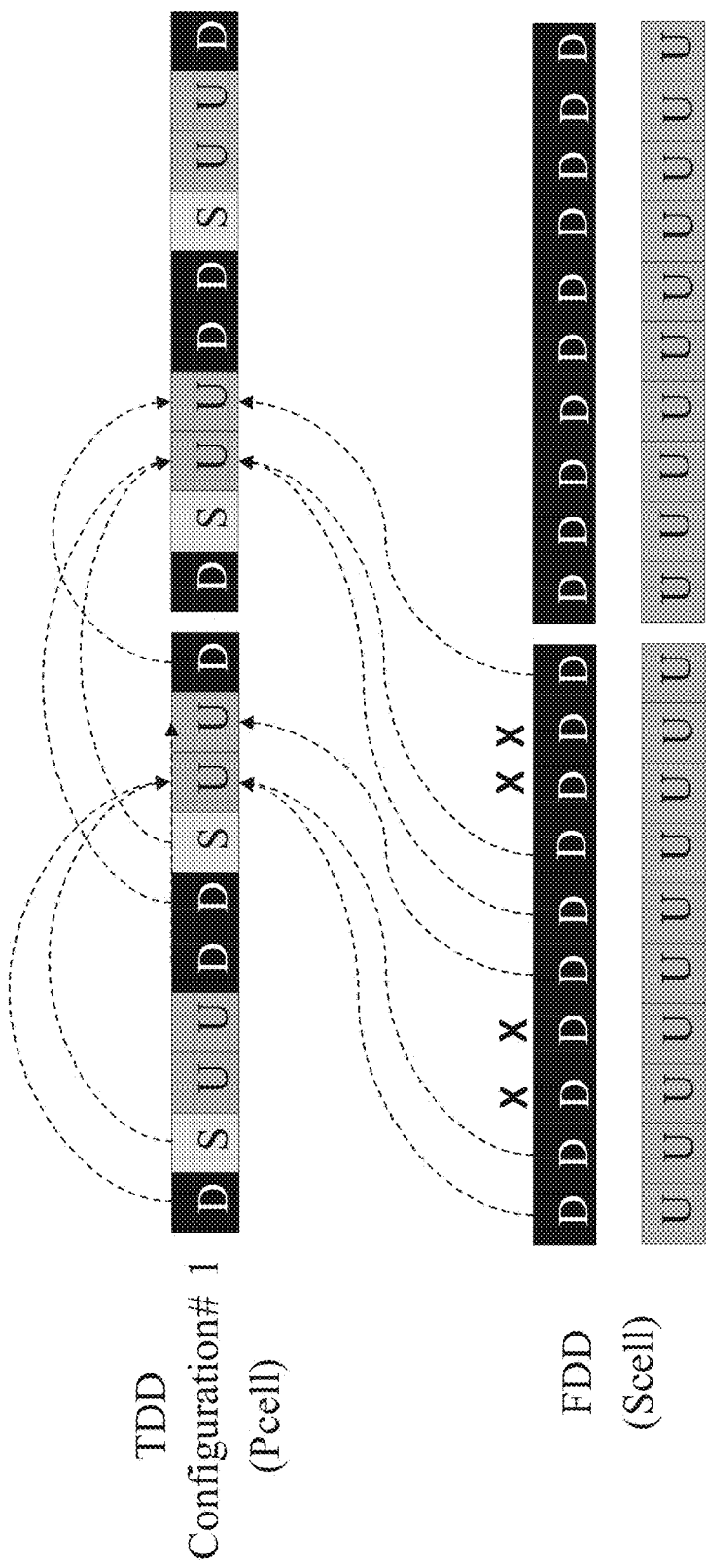

FIG. 8 illustrates a configuration 1 TDD based cell functioning as a PCell which is aggregated with a FDD based SCell. As shown, the FDD based SCell follows the HARQ control timing of configuration 1, as provided in Tables 1 and 2. Configuration 1 indicates that HARQ feedback be provided in subframes 2, 3, 7 and 8. According to Tables 1 and 2, subframe 2 comprises k values of 7 and 6 for configuration 1. Therefore, HARQ feedback for the PCell in subframe 2 is provided for downlink transmissions from subframes 5 and 6 from the SCell, as is provided in the modular 10 calculation of n−k.

Similarly, HARQ feedback for the PCell in subframe 3 is provided for downlink transmissions from subframe 9 from the SCell; HARQ feedback for the PCell in subframe 7 is provided for downlink transmissions from subframes 0 and 1 from the SCell; and HARQ feedback for the PCell in subframe 8 is provided for downlink transmissions from subframe 4 from the SCell. Therefore, through configuration 1, there is no available HARQ scheduling for downlink transmissions received in subframes 2, 3, 7 and 8 of the FDD SCell, as is indicated by X's in FIG. 8.

Thus, it should be appreciated that example embodiments which provide HARQ scheduling based on the configuration of the PCell allow for simplified implementation with a potential drawback being that some of the downlink subframes of the FDD based SCell may not be available for HARQ control timing.

HARQ Scheduling Based on Subframe Hierarchy

Figure 9:
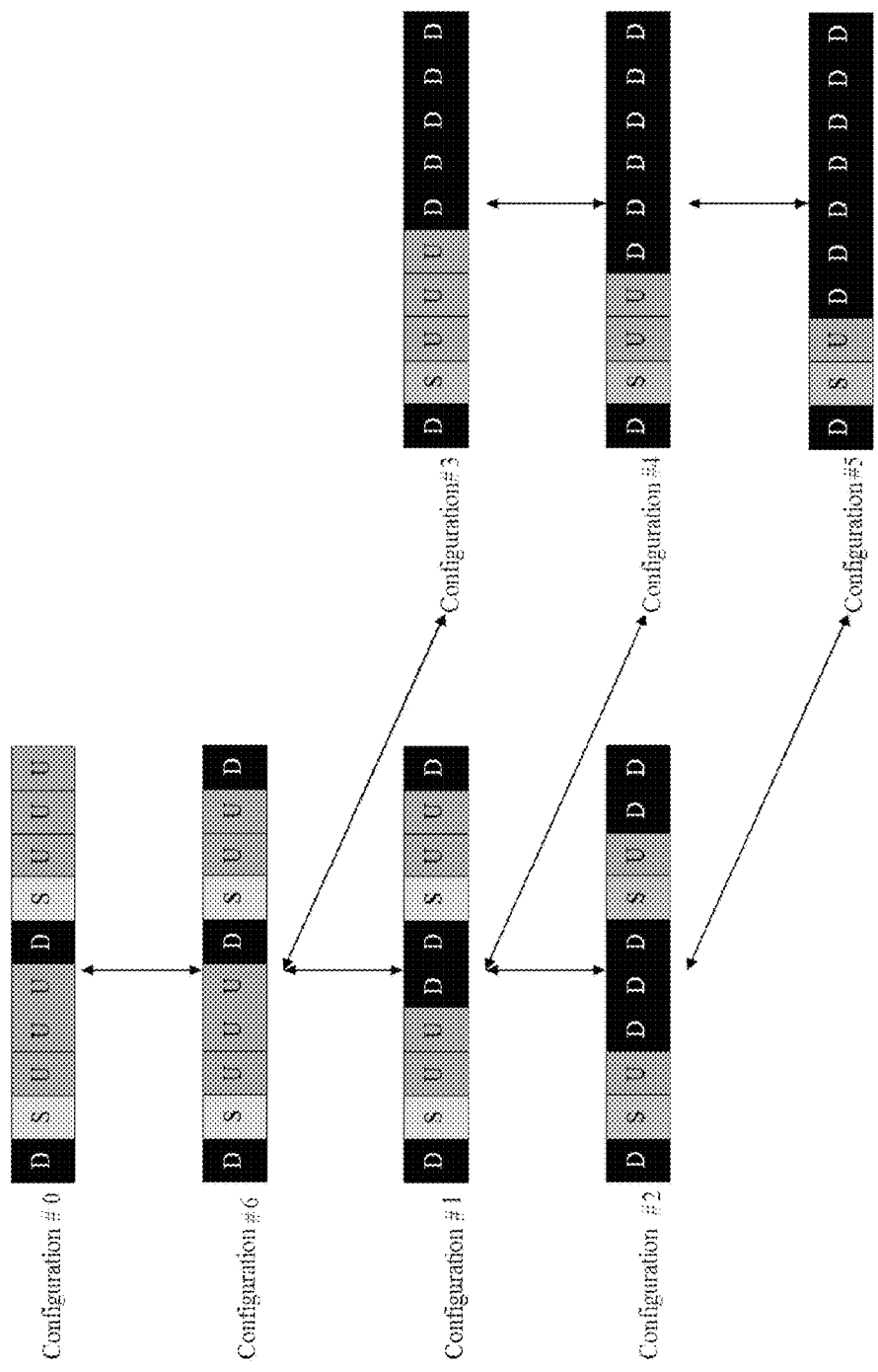
FIG. 9 illustrates a subframe configuration hierarchy according to some of the example embodiments.

According to some of the example embodiments, the choice of which configuration the SCell shall use for determining HARQ control timing is based on a subframe hierarchy, as illustrated in FIG. 9. It should be appreciated that the hierarchical ordering of FIG. 9 is further described in WO2013/025143.

The subframe hierarchy may be designed with the following principles:

(1) The UL subframes in a TDD configuration are also UL subframes in those TDD configurations that can be corrected with upward arrows.

For example, subframes 2 and 3 are UL subframes in configuration 4. These two subframes are also UL in configurations 3, 1, 6 and 0, all of which can be connected from configuration 4 with upward arrows. As a second example, subframes 2 and 7 are UL subframes in configuration 2. These two subframes are not both UL in configuration 3 because there is no upward arrow connecting the two configurations.

(2) The DL subframes in a TDD configuration are also DL subframes in those TDD configurations that can be corrected with downward arrows.

For example, subframe 0, 1, 5, 6 and 9 are DL subframes in configuration 6. These five subframes are also DL in configurations 1, 2, 3, 4 and 5, all of which can be connected from configuration 6 with downward arrows. As a second example, subframe 7 is a DL subframe in configuration 3 but not a DL subframe in configuration 2 because there is no downward arrow connecting the two configurations.

With these design properties, the subframe hierarchy may provide the following utility:

(1) Given a set of TDD configurations to be aggregated, a TDD configuration that can be connected from all of the given TDD configurations with upward arrows has the following two properties:
  The TDD configuration comprises UL subframes that are a superset of all UL subframes from all given TDD configurations.
  The TDD configuration comprises DL subframes that are available in all given TDD configurations.

Given the subframe hierarchy described above, according to some of the example embodiments, the FDD based SCell may be configured to always use UL/DL configuration 5 as the timing reference configuration for DL HARQ feedback regardless of the configuration associated with the TDD based PCell. Configuration 5 comprises the greatest number of downlink subframes, therefore, by choosing configuration 5 for DL HARQ feedback, the number of FDD subframes unavailable for feedback is reduced. As illustrated in FIG. 8, subframes 2, 3, 7 and 8 are unavailable for DL HARQ feedback. However, with configuration 5, only subframe 2 of the FDD based SCell will be unavailable for DL HARQ feedback.

According to some of the example embodiments, the FDD based SCell may be configured to use UL/DL configuration 2 as the timing reference configuration if the UL/DL configuration of the TDD based PCell is 0, 1, 2 or 6. As illustrated from the hierarchy of FIG. 9, configuration 2 encompasses all of the same downlink subframes as configurations 0, 1, 2 and 6. Similarly, according to some of the example embodiments, the FDD based SCell may be configured to use UL/DL configuration 5 as the timing reference configuration if the UL/DL configuration of the TDD based PCell is 3, 4 or 5, as illustrated in FIG. 10.

Figure 10:
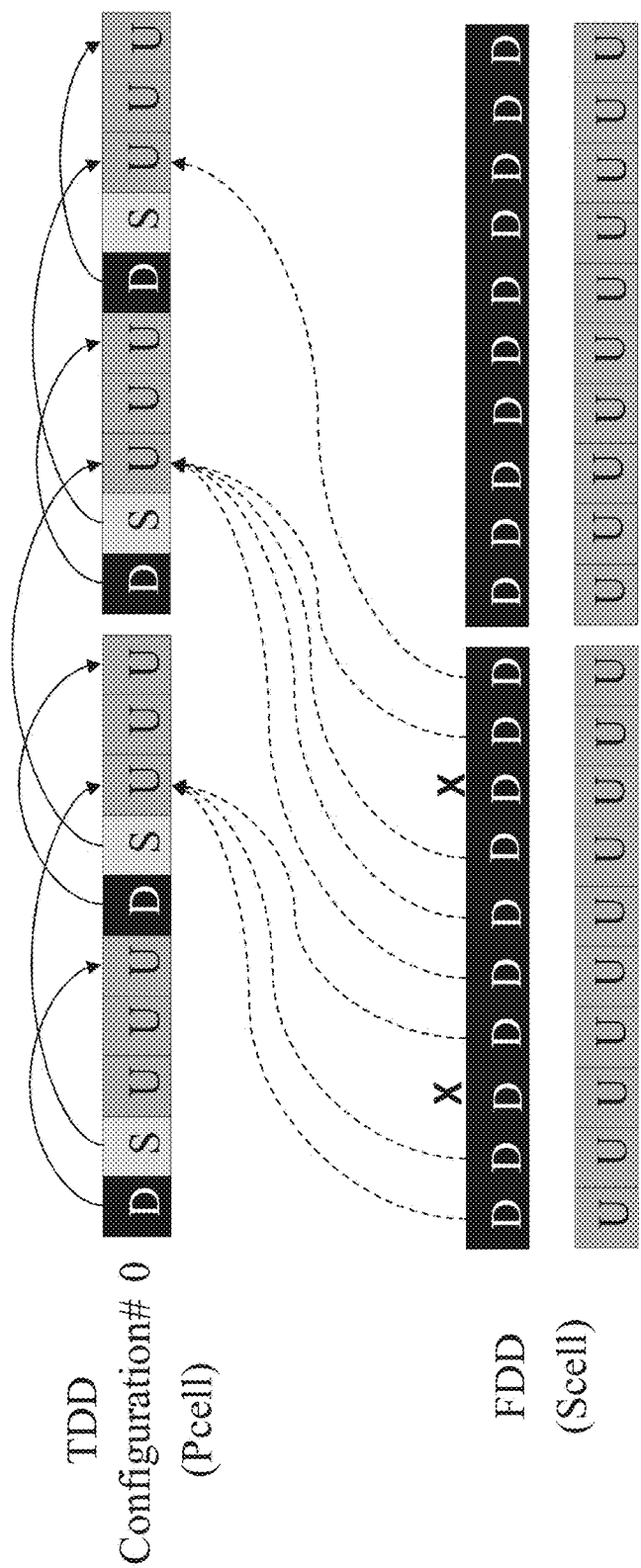
FIGS. 10-13 further illustrate examples of control timing for FDD and TDD aggregated cells, according to some of the example embodiments.

In the example provided in FIG. 10, the TDD based PCell comprises a configuration of 0. Thus, based on the subframe hierarchy, a UL/DL configuration of 2 is used as the timing reference configuration. As provided in Tables 1 and 2, a UL/DL configuration of 2 provides for all HARQ feedback to be sent to subframes 2 and 7.

HARQ Scheduling Based on Association Sets

According to some of the example embodiments, HARQ control timing may be determined based on an association set. For an association set K of a UL/DL configuration X, let the $k_{min}$ and $k_{max}$ denote the smallest and the large values in the association set K. The completed association set is then given by $K^* = \{k_{min}, k_{min}+1, \ldots, k_{max}\}$. For example, for UL/DL configuration 2, the association K={8, 7, 4, 6} gives $k_{min}$=4 and $k_{max}$=8. Therefore, the completed association set is K={8, 7, 4, 6, 5}.

This association set completion may be computed by the eNB and user equipment as part of the TDD+FDD carrier aggregation configuration. Alternatively, the completed association sets may be pre-computed and stored in a nonvolatile memory. Furthermore, the completed association may be described in the system operation specification such as 3GPP TS 36.213.

For ease of describing the embodiments in the following, Table 3 is provided with calculated association sets which are labelled with starred UL/DL configuration numbers. Thus, a "FDD SCell which uses UL/DL configuration 2* as the timing reference configuration," means that the DL HARQ timing of the FDD SCell is defined by the completed association sets tabulated in the 2* row of Table 3. In Table 3, the values added via association are denoted in bold and underlined text.

configuration 3* as the timing reference configuration if the UL/DL configuration of the TDD based PCell is 3. The FDD based SCell may be configured to use UL/DL configuration 4* as the timing reference configuration if the UL/DL configuration of the TDD based PCell is 4. The FDD based SCell may be configured to use UL/DL configuration 5* as the timing reference configuration if the UL/DL configuration of the TDD based PCell is 5. Thus, according to this example embodiment, the timing reference configuration is N* if the configuration of the TDD based PCell is N, where N is an integer from 3-5.

The determination of which associated set to use is based on the subframe hierarchy as described in the above section. With the use of associated sets, the problem of certain downlink frames being unavailable for HARQ feedback is avoided.

Figure 11:
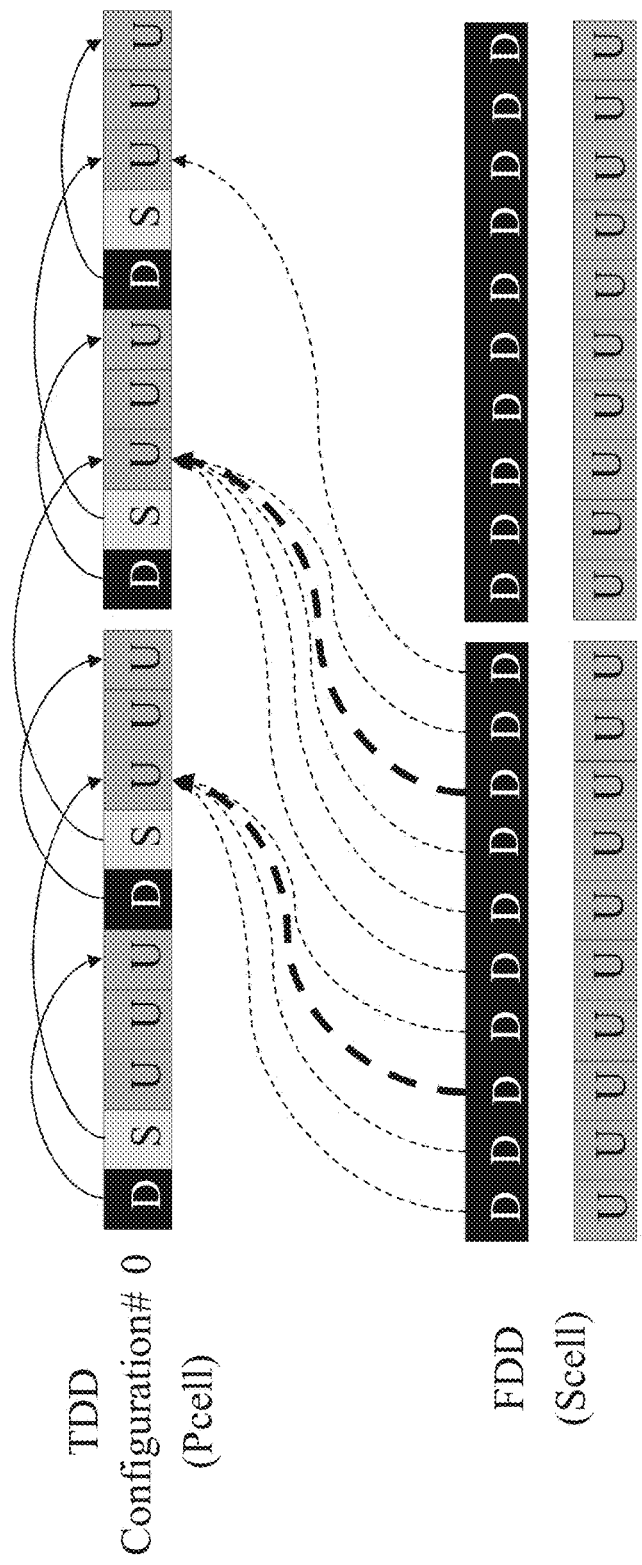

FIG. 11 illustrates a similar configuration as FIG. 10, where the TDD based PCell comprises a configuration of 0. In FIG. 11, the FDD based SCell uses configuration 2* for HARQ control timing. In contrast to the HARQ feedback of FIG. 10, the feedback timings of FIG. 11 feature HARQ feedback for subframes 2 and 7, denoted by bold and dashed lines. The HARQ feedback originating from subframes 2 and 7, in FIG. 11, is provided by the added k value of 5 in associated set 2* for subframes 2 and 7. Thus, all of the downlink subframes may provide HARQ feedback with the use of the associated set.

HARQ Scheduling Based on Extended Association Sets

It may be observed that the number of HARQ-ACK feedback bits per feedback period, according to the example embodiments in the previous section, may become large for certain TDD+FDD carrier aggregation combinations. This concept is illustrated in FIG. 11. In FIG. 11 subframe number 2 is a PCell UL in which the user equipment will send HARQ-ACK feedback. The figure illustrates that the

TABLE 3

Completed downlink association set index K = {$k_0, k_1, \ldots, k_{M-1}$}

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

Thus, according to some of the example embodiments, the FDD based SCell may be configured to use UL/DL configuration 2* as the timing reference configuration if the UL/DL configuration of the TDD based PCell is 0, 1, 2 or 6. Similarly, the FDD based SCell may be configured to use UL/DL configuration 5* as the timing reference configuration if the UL/DL configuration of the TDD based PCell is 3, 4 or 5.

According to some of the example embodiments, the FDD based SCell may be configured to use UL/DL configuration 2* as the timing reference configuration if the UL/DL configuration of the TDD based PCell is 0, 1, 2 or 6. The FDD based SCell may be configured to use UL/DL user equipment needs to send HARQ-ACK for 6 subframes (1 subframe for PCell and 5 subframes for SCell). The user equipment will then need to send 6 or 12 bits in this UL subframe depending on whether the UL is configured PDSCH of one or two transport blocks.

To further improve upon this aspect, a more sophisticated association set completion may be provided. For instance, the set completion computation for UL/DL configuration 1 may impose the $k_{min}$=4 condition in some subframes. The term $k_{min}$ is the minimum value of the association set K. The extended completed association sets are tabulated in Table 4. In Table 4, the values added via extended association are denoted in bold and underlined text.

TABLE 4

| UL-DL Configuration | \multicolumn{10}{c}{Extended completed downlink association set index K = {$k_0, k_1, \ldots, k_{M-1}$}} |
|---|---|---|---|---|---|---|---|---|---|---|

| UL-DL Configuration | 0 | 1 | 2 | 3 | 4 | 5 | 6 | 7 | 8 | 9 |
|---|---|---|---|---|---|---|---|---|---|---|
| 0* | | | 6, 5, 4 | | 4, 5 | | | 6, 5, 4 | | 4, 5 |
| 1* | | | 7, 6, 5, 4 | 4 | | | | 7, 6, 5, 4 | 4 | |
| 6* | | | 7 | 7, 6, 5 | 5 | | | 7, 6, 5, 4 | 7 | |

Combining the configurations of Table 3 with the configurations of Table 4 yields a fully extended association configuration set provided below in Table 5.

TABLE 5

| UL-DL Configuration | 0 | 1 | 2 | 3 | 4 | 5 | 6 | 7 | 8 | 9 |
|---|---|---|---|---|---|---|---|---|---|---|
| 0* | | | 6, 5, 4 | | 4, 5 | | | 6, 5, 4 | | 4, 5 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |
| 6* | | | 7 | 7, 6, 5 | 5 | | | 7, 6, 5, 4 | 7 | |

According to some of the example embodiments, the FDD based SCell may be configured to use UL/DL configuration 1* as the timing reference configuration if the UL/DL configuration of the TDD based PCell is 0, 1 or 6. The FDD based SCell may be configured to use UL/DL configuration 2* as the timing reference configuration if the UL/DL configuration of the TDD based PCell is 2. The FDD based SCell may be configured to use UL/DL configuration 3* as the timing reference configuration if the UL/DL configuration of the TDD based PCell is 3. The FDD based SCell may be configured to use UL/DL configuration 4* as the timing reference configuration if the UL/DL configuration of the TDD based PCell is 4. The FDD based SCell may be configured to use UL/DL configuration 5* as the timing reference configuration if the UL/DL configuration of the TDD based PCell is 5.

Figure 12:
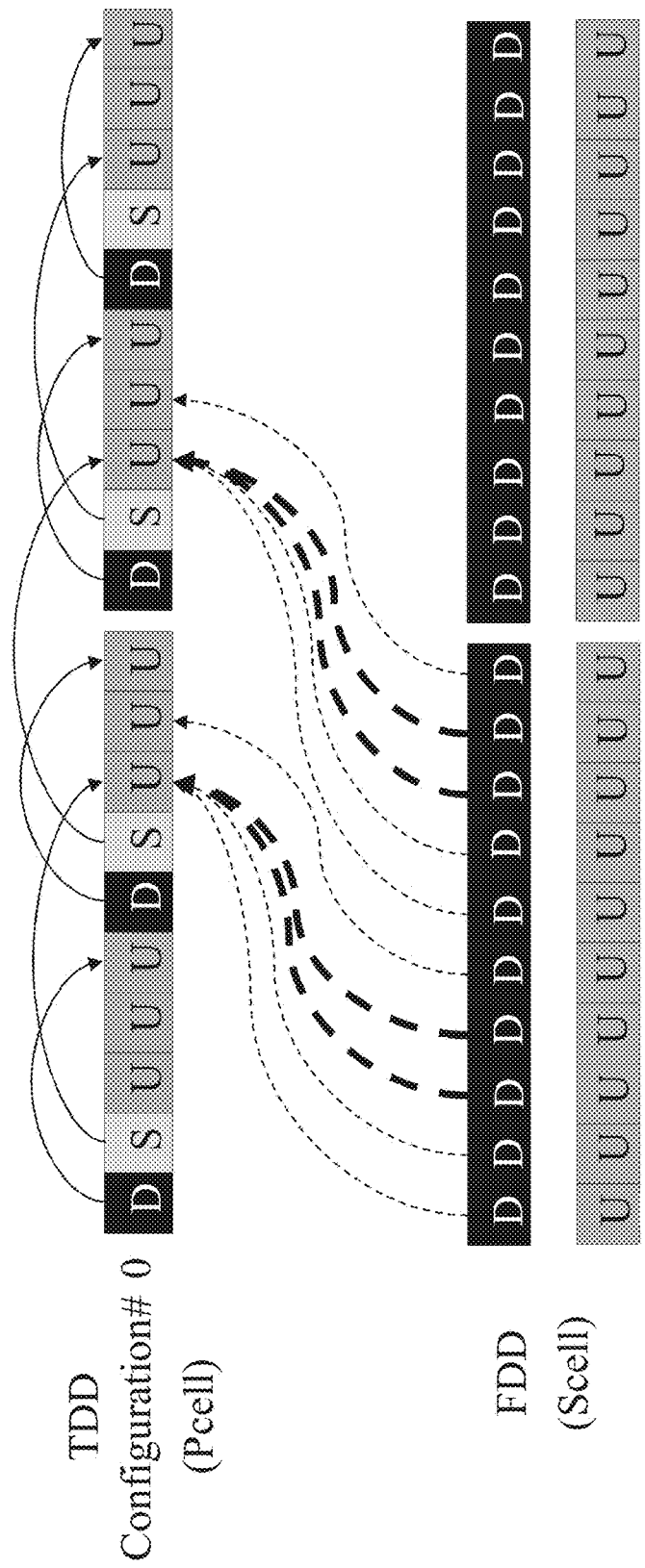

FIG. 12 illustrates the example embodiment described above. In FIG. 12, the TDD based PCell comprises a configuration of 0 and the FDD based SCell uses configuration 1* for HARQ control timing. For configuration 1*, Table 5 provides extended k values of 5 and 4 for subframes 2 and 7. As a result, additional HARQ feedback is provided from the FDD based cell in subframes 7 and 8 to TDD subframe 2. Further additional HARQ feedback is provided from the FDD based cell in subframes 2 and 3 to TDD subframe 7. It should be appreciated that the example embodiment described above and in FIG. 12 is provided with use of the hierarchical order of configuration numbers as described in FIG. 9. It should further be appreciated that via a comparison of FIGS. 11 and 12, a reduction in the maximum number of HARQ-ACK bits per feedback from 6 to 5 has occurred.

Figure 13:
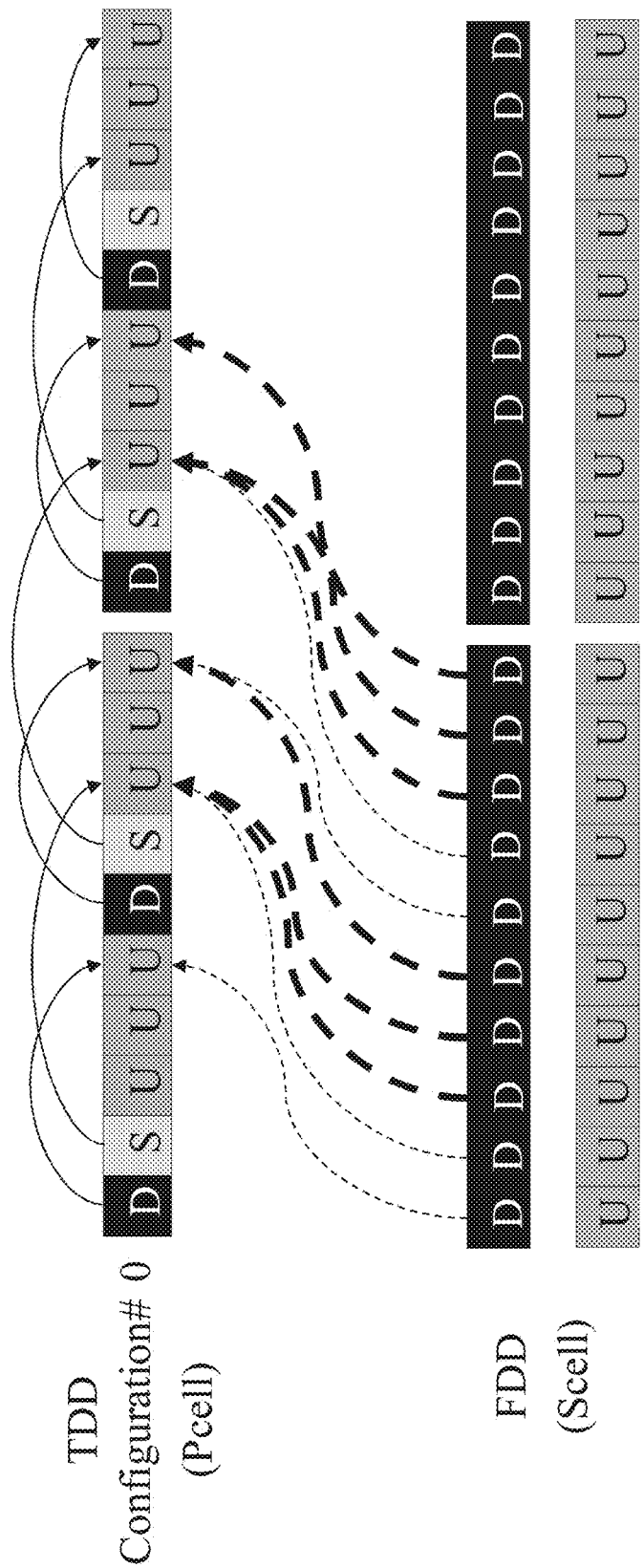

According to some of the example embodiments, the FDD based SCell uses UL/DL configuration X* as the timing reference configuration if the UL/DL configuration of the TDD based PCell is X. An example according to this embodiment is illustrated in FIG. 13. In FIG. 13, the TDD based PCell comprises a configuration of 0 and the FDD based SCell uses configuration 0* for HARQ control timing.

Comparing FIG. 12 and FIG. 13, a reduction in the maximum number of HARQ-ACK bits per feedback period from 5 to 4 may be observed.

DL HARQ-ACK Timing for Cross-Carrier Scheduling Configuration

According to some of the example embodiments, downlink HARQ-ACK is provided in a cross-carrier scheduling configuration. According to these example embodiments, the PDSCH scheduling information for a SCell is transmitted via the PDCCH/EPDCCH on another serving cell, which may be the PCell or a different SCell but, in most applicable cases, it is the PCell.

According to some of the example embodiments, if the PCell is the FDD carrier, a TDD SCell shall follow the DL HARQ timing defined by the UL/DL configuration F in the extended DL association set of Table 2. According to some of the example embodiments, if the PCell is a TDD carrier, a FDD SCell shall follow the DL HARQ timings defined by the UL/DL configuration of the TDD PCell.

Example Node Configurations

Figure 14:
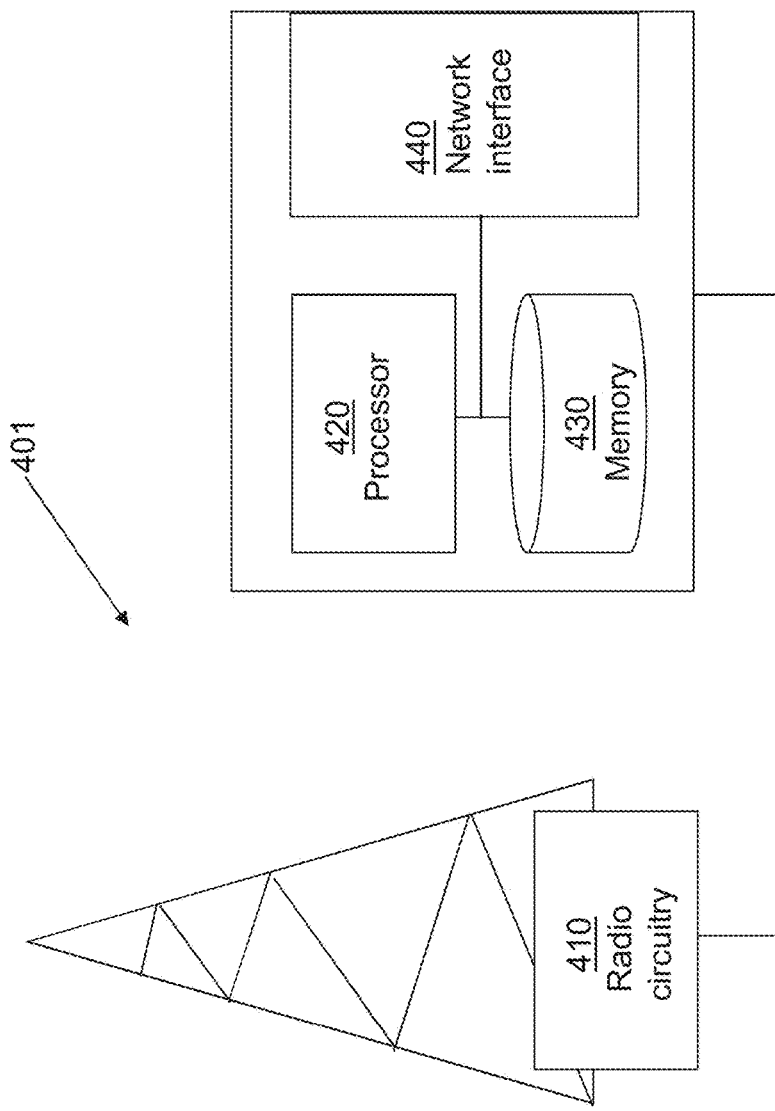
FIG. 14 illustrates an example node configuration of a base station, according to some of the example embodiments.

FIG. 14 illustrates an example node configuration of a base station 401 which may perform some of the example embodiments described herein. The base station 401 may comprise radio circuitry or a communication port 410 that may be configured to receive and/or transmit communication data, instructions, and/or messages. It should be appreciated that the radio circuitry or communication port 410 may comprise any number of transceiving, receiving, and/or transmitting units or circuitry. It should further be appreciated that the radio circuitry or communication port 410 may be in the form of any input or output communications port known in the art. The radio circuitry or communication port 410 may comprise RF circuitry and baseband processing circuitry (not shown).

The base station 401 may also comprise a processing unit or circuitry 420 which may be configured to implement HARQ-ACK control timing as described herein. The processing circuitry 420 may be any suitable type of computation unit, for example, a microprocessor, digital signal processor (DSP), field programmable gate array (FPGA), or application specific integrated circuit (ASIC), or any other form of circuitry. The base station 401 may further comprise a memory unit or circuitry 430 which may be any suitable type of computer readable memory and may be of volatile and/or non-volatile type. The memory 430 may be configured to store received, transmitted, and/or measured data, device parameters, communication priorities, and/or executable program instructions, e.g., scheduling instructions. The memory 430 may also be configured to store any form of configuration tables as described herein.

Figure 15:
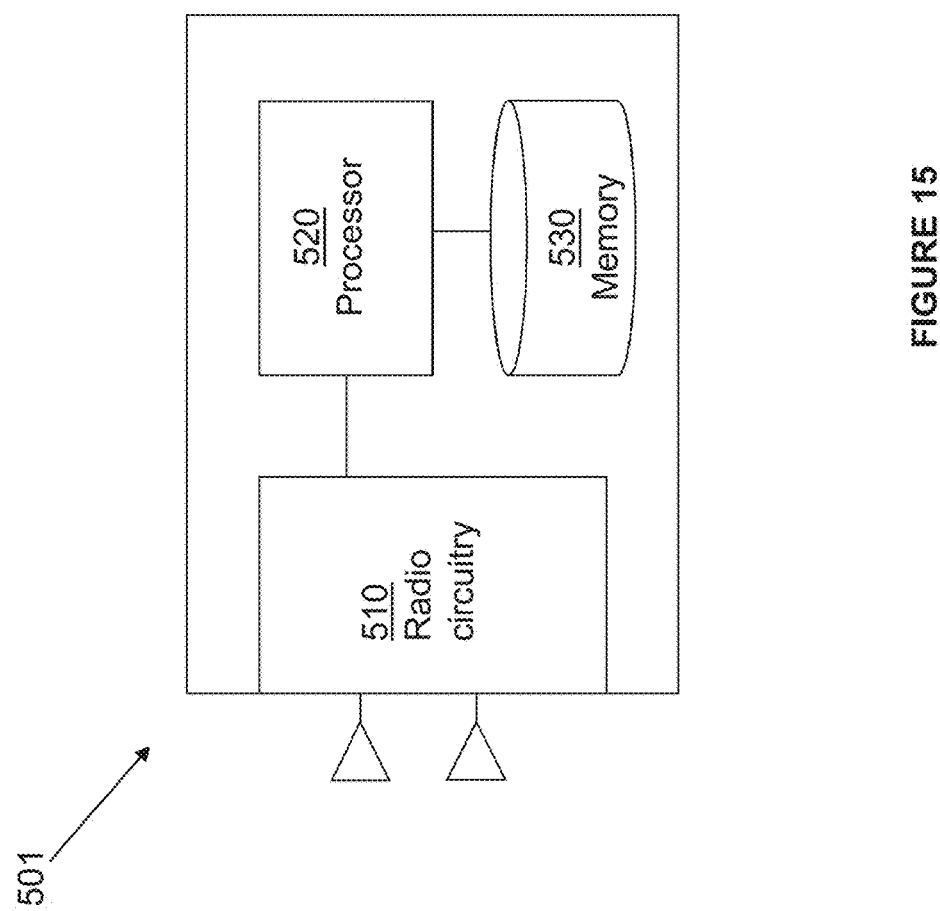
FIG. 15 illustrates an example node configuration of a user equipment, according to some of the example embodiments.

FIG. 15 illustrates an example node configuration of a user equipment 501 which may perform some of the example embodiments described herein. The user equipment 501 may comprise radio circuitry or a communication port 510 that may be configured to receive and/or transmit communication data, instructions, and/or messages. It should be appreciated that the radio circuitry or communication port 510 may comprise any number of transceiving, receiving, and/or transmitting units or circuitry. It should further be appreciated that the radio circuitry or communication port 510 may be in the form of any input or output communications port known in the art. The radio circuitry or communication port 510 may comprise RF circuitry and baseband processing circuitry (not shown).

The user equipment 501 may also comprise a processing unit or circuitry 520 which may be configured to implement HARQ-ACK control timing, as described herein. The processing circuitry 520 may be any suitable type of computation unit, for example, a microprocessor, digital signal processor (DSP), field programmable gate array (FPGA), or application specific integrated circuit (ASIC), or any other form of circuitry. The user equipment 501 may further comprise a memory unit or circuitry 530 which may be any suitable type of computer readable memory and may be of volatile and/or non-volatile type. The memory 530 may be configured to store received, transmitted, and/or measured data, device parameters, communication priorities, and/or executable program instructions, e.g., scheduling instructions. The memory 530 may also be configured to store any form of configuration tables as described herein.

Example Node Operations

Figure 16:
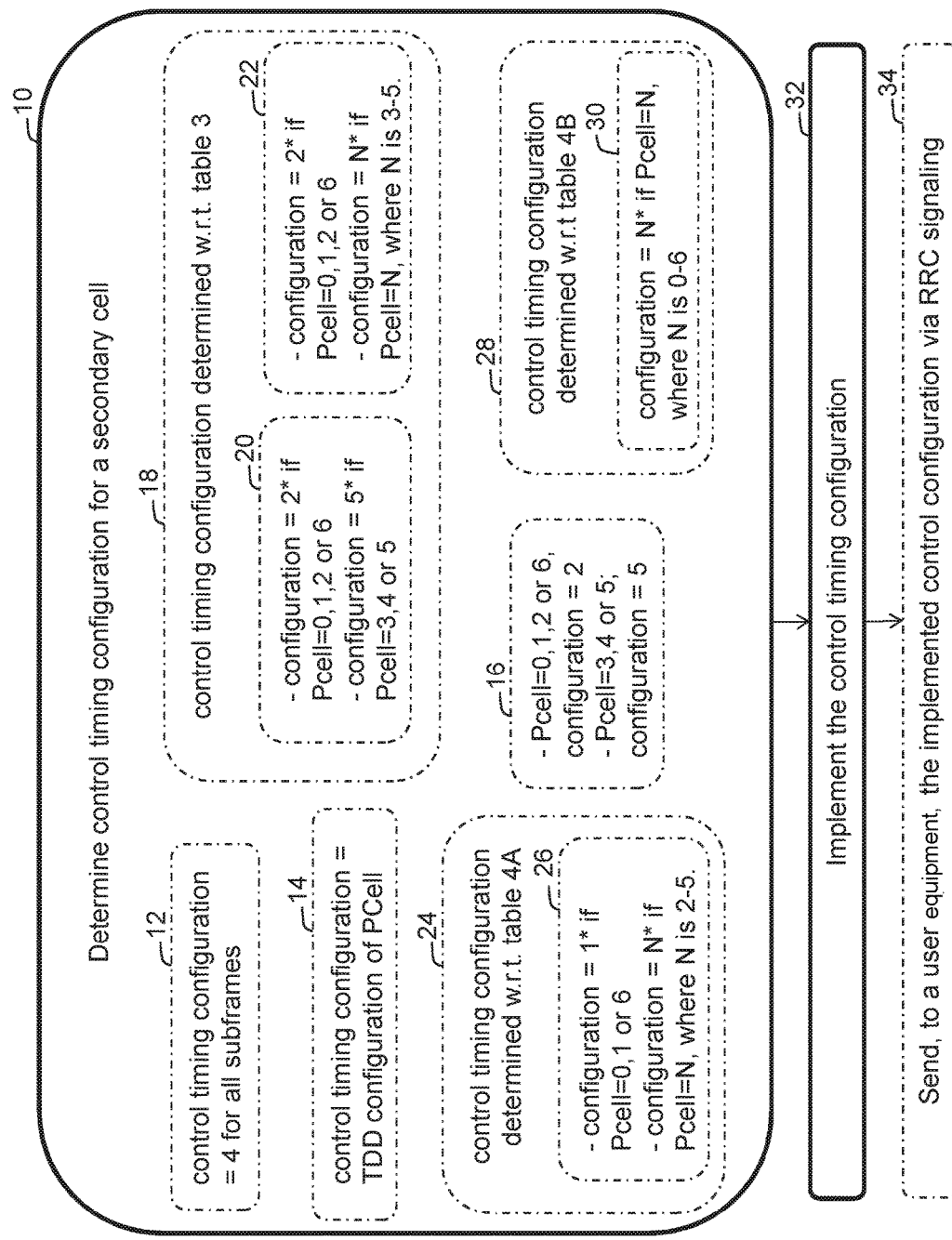
FIG. 16 is a flow diagram illustrating example operations which may be carried out by the base station of FIG. 14, according to some of the example embodiments.

FIG. 16 is a flow diagram depicting example operations which may be performed by the base station 401 as described herein to implement HARQ-ACK control timing, as described herein. It should be appreciated that FIG. 16 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be performed in addition to the operations of the broader example embodiments. It should be appreciated that these operations need not be performed in order. Furthermore, it should be appreciated that not all of the operations need to be performed. The example operations may be performed in any order and in any combination.

Operation 10

The base station is configured to determine 10 a control timing configuration for a secondary cell (SCell). The secondary cell is one of a TDD based cell or a FDD based cell. The determining 10 is based on a control timing configuration of a primary cell (PCell). The primary cell is one of the FDD based cell or the TDD based cell, respectively. The processing circuitry 420 is configured to determine the control timing configuration for the secondary cell.

Example Operation 12

According to some of the example embodiments, the primary cell may be a FDD based cell and the secondary cell may be a TDD based cell. According to these example embodiments, the determining 10 may further comprise determining 12 the control timing configuration to comprise a HARQ-ACK feedback timing value of 4 for all subframes. The processing circuitry 420 is configured to determine the control timing configuration to comprise a HARQ-ACK feedback timing value of 4 for all subframes.

Example operation 12 is further described under at least the subheadings 'FDD carrier as the PCell' and 'DL HARQ-ACK timings for cross-carrier scheduling configuration', Table 2 and FIG. 7.

Example Operation 14

According to some of the example embodiments, the primary cell may be a TDD based cell and the secondary cell may be a FDD based cell. According to some of these example embodiments, the determining 10 may further comprise determining 14 the control timing configuration to be equivalent to a TDD configuration of the primary cell. The processing circuitry 420 is configured to determine the control timing configuration to be equivalent to the TDD configuration of the primary cell.

Example operation 14 is further described under at least the subheadings 'HARQ scheduling based on PCell configuration' and 'DL HARQ-ACK timings for cross-carrier scheduling configuration' and FIG. 8.

Example Operation 16

According to some of the example embodiments, the primary cell may be a TDD based cell and the secondary cell may be a FDD based cell. According to some of these example embodiments, the determining 10 may further comprise determining 16 the control timing configuration to be configuration 2 if the configuration number of the primary cell is 0, 1, 2 or 6; or determining 16 the control timing configuration to be 5 if the configuration number of the primary cell is 3, 4 or 5. The processing circuitry is configured to determine the control timing configuration to be configuration 2 if the configuration number of the primary cell is 0, 1, 2 or 6; or configuration 5 is the configuration number of the primary cell is 3, 4 or 5.

Example operation 14 is further described under at least the subheading 'HARQ scheduling based on subframe hierarchy' and FIGS. 9 and 10.

Example Operation 18

According to some of the example embodiments, the primary cell may be a TDD based cell and the secondary cell may be a FDD based cell. According to some of these example embodiments, the determining 10 may further comprise determining 18 the control timing configuration based on a first altered configuration table. The first altered configuration table is provided below:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

The processing circuitry 420 is configured to determine the control timing configuration based on the first alteration configuration table provided above.

Example operation 18 is described further under at least the subheading 'HARQ scheduling based on association sets', Table 3 and FIG. 11.

Example Operation 20

According to some of the example embodiments, the determining 18 may further comprise determining 20 the control timing configuration to be 2* (as provided in the first altered configuration table) if the control timing configuration of the primary cell is 0, 1, 2 or 6; or configuration 5* (as provided in the first altered configuration table) if the control timing configuration of the primary cell is 3, 4 or 5. The processing circuitry 420 is configured to determine the control timing configuration to be 2* (as provided in the first altered configuration table) if the control timing configuration of the primary cell is 0, 1, 2 or 6; or configuration 5* (as provided in the first altered configuration table) if the control timing configuration of the primary cell is 3, 4 or 5.

Example operation 20 is further described under at least the subheading 'HARQ scheduling based on association sets', Table 3 and FIG. 11. It should be appreciated that the choice of configuration 2* and configuration 5* is provided via the subframe hierarchy described under at least the subheading 'HARQ scheduling based on subframe hierarchy' and FIG. 9.

Example Operation 22

According to some of the example embodiments, the determining 18 may further comprise determining 22 the control timing configuration to be 2* if the control timing configuration of the primary cell is 0, 1, 2 or 6; or N* if the control timing configuration of the primary cell is N, where N is an integer with a value of 3-5. The processing circuitry 420 is further configured to determine the control timing configuration to be 2* if the control timing configuration of the primary cell is 0, 1, 2 or 6; or N* if the control timing configuration of the primary cell is N, where N is an integer with a value of 3-5.

Example operation 22 is further described under at least the subheading 'HARQ scheduling based on association sets', Table 3 and FIG. 11. It should be appreciated that the choice of configuration 2* for primary cells with a control timing configuration of 0, 1, 2 or 6 is provided via the subframe hierarchy described under at least the subheading 'HARQ scheduling based on subframe hierarchy' and FIG. 9.

Example Operation 24

According to some of the example embodiments, the primary cell may be a TDD based cell and the secondary cell may be a FDD based cell. According to some of these example embodiments, the determining 10 may further comprise determining 24 the control timing configuration based on a second altered configuration table. The second altered configuration table is provided below:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

The processing circuitry 420 is configured to determine the control timing configuration based on the second altered configuration table provided above.

Example operation 24 is described further under the subheading 'HARQ scheduling based on extended association sets', Tables 4 and 5, and FIGS. 12 and 13.

Example Operation 26

According to some of the example embodiments, the determining 24 further comprises determining 26 the control timing configuration to be 1* (from the second altered configuration table provided in example operation 24) if the control timing configuration of the primary cell is 0, 1 or 6; or N* if the control timing configuration of the primary cell is N, where N is an integer valued from 2-5. The processing circuitry 420 is configured to determine the control timing configuration to be 1* (from the second altered configuration table provided in example operation 24) if the control timing configuration of the primary cell is 0, 1 or 6; or N* if the control timing configuration of the primary cell is N, where N is an integer valued from 2-5.

Example operation 26 is further described under at least the sub-heading 'HARQ scheduling based on extended association sets', Tables 4 and 5, and FIGS. 12 and 13. It should be appreciated that the choice of configuration 1* for primary cells with a control timing configuration of 0, 1, or 6 is provided via the subframe hierarchy described under at least the subheading 'HARQ scheduling based on subframe hierarchy' and FIG. 9.

Example Operation 28

According to some of the example embodiments, the primary cell may be a TDD based cell and the secondary cell may be a FDD based cell. According to some of these example embodiments, the determining 10 may further comprise determining 28 the control timing configuration based on a third altered configuration table. The third altered configuration table is provided below:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0* | | | 6, 5, 4 | | 4, 5 | | | 6, 5, 4 | | 4, 5 |
| 1* | | | 7, 6, 5, 4 | | 4 | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |
| 6* | | | 7 | 7, 6, 5 | 5 | | | 7, 6, 5, 4 | 7 | |

The processing circuitry 420 is configured to determine the control timing configuration based on the third altered configuration table provided above.

Example operation 28 is further described under at least the subheading 'HARQ scheduling based on extended association sets', Tables 4 and 5, and FIGS. 12 and 13.

Example Operation 30

According to some of the example embodiments, the determining 28 may further comprise determining 30 the control timing configuration to be N* if the control timing configuration of the primary cell is N, where N is an integer valued from 0-6. The processing circuitry 420 is configured to determine the control timing configuration to be N* if the control timing configuration of the primary cell is N, where N is an integer valued from 0-6.

Example operation 30 is further described under at least the subheading 'HARQ scheduling based on extended association sets', Tables 4 and 5, and FIGS. 12 and 13.

Operation 32

The base station is also configured to implement 32 the control timing configuration for downlink HARQ-ACK control timing for a cell serving the user equipment. The processing circuitry 420 is configured to implement the control timing configuration for downlink HARQ-ACK control timing for a cell serving the user equipment.

Example Operation 34

According to some of the example embodiments, the base station is further configured to send 34, to the user equipment, the implemented control configuration via RRC signalling. The radio circuitry 410 is configured to send, to the user equipment, the implemented control configuration via RRC signalling.

Figure 17:
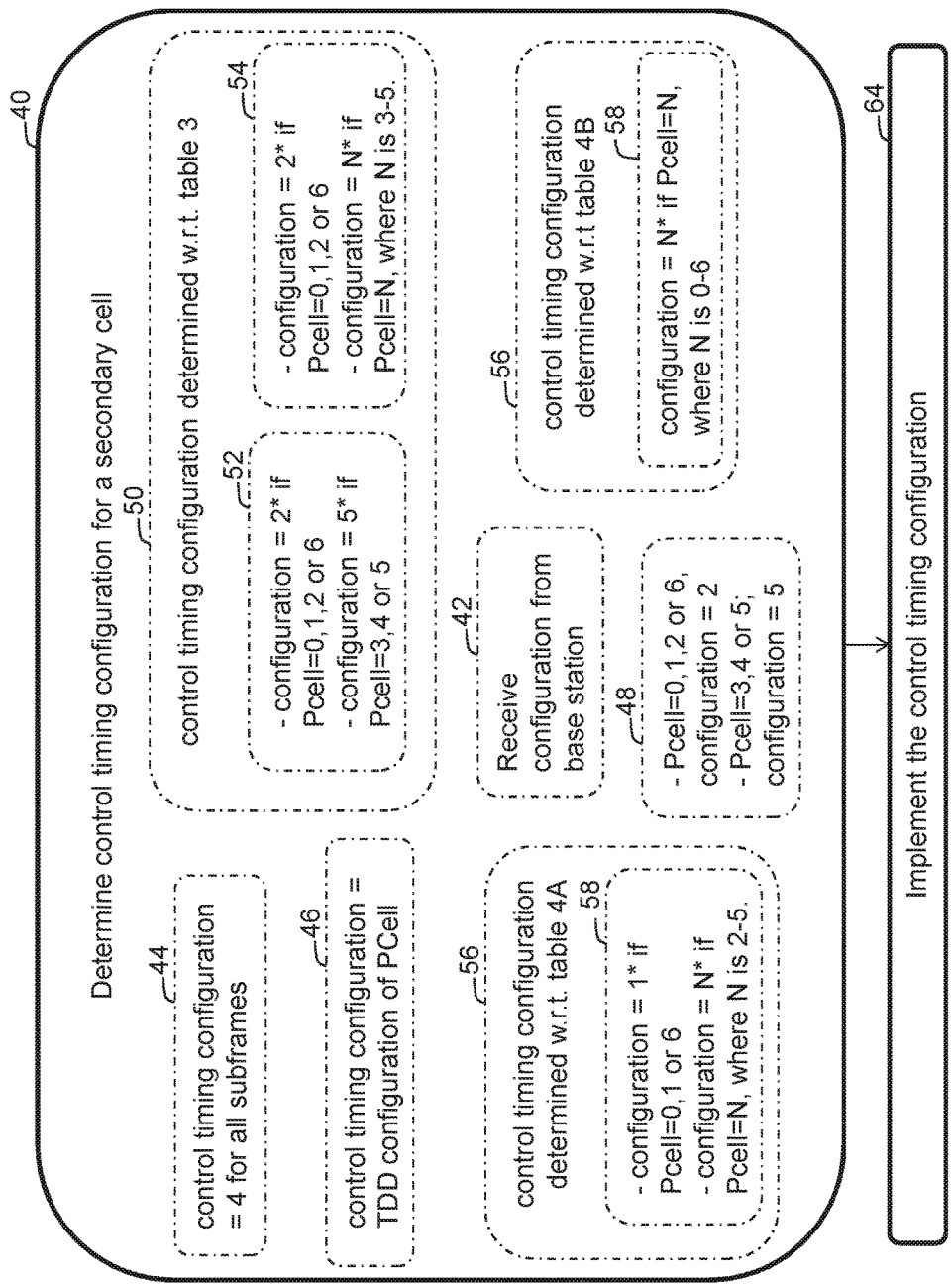
FIG. 17 is a flow diagram illustrating example operations which may be carried out by the user equipment of FIG. 15, according to some of the example embodiments.

FIG. 17 is a flow diagram depicting example operations which may be performed by the user equipment 501 as described herein to implement HARQ-ACK control timing, as described herein. It should be appreciated that FIG. 17 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be performed in addition to the operations of the broader example embodiment. It should be appreciated that these operations need not be performed in order. Furthermore, it should be appreciated that not all of the operations need to be performed. The example operations may be performed in any order and in any combination.

Operation 40

The user equipment is configured to determine 40 a control timing configuration for a secondary cell (SCell). The secondary cell is one of a TDD based cell or a FDD based cell. The determining 40 is based on a control timing configuration of a primary cell (PCell). The primary cell is one of the FDD based cell or the TDD based cell, respectively. The processing circuitry 520 is configured to determine the control timing configuration for the secondary cell.

Example Operation 42

According to some of the example embodiments, the determining 40 further comprises receiving 42, from a base station, the control timing configuration via RRC signalling. The radio circuitry 510 is further configured to receive, from the base station, the control timing configuration via RRC signalling.

Example Operation 44

According to some of the example embodiments, the primary cell may be a FDD based cell and the secondary cell may be a TDD based cell. According to these example embodiments, the determining 40 may further comprise determining 44 the control timing configuration to comprise a HARQ-ACK feedback timing value of 4 for all subframes. The processing circuitry 520 is configured to determine the control timing configuration to comprise a HARQ-ACK feedback timing value of 4 for all subframes.

Example operation 44 is further described under at least the subheadings 'FDD carrier as the PCell' and 'DL HARQ-ACK timings for cross-carrier scheduling configuration', Table 2 and FIG. 7.

Example Operation 46

According to some of the example embodiments, the primary cell may be a TDD based cell and the secondary cell may be a FDD based cell. According to some of these example embodiments, the determining 40 may further comprise determining 46 the control timing configuration to be equivalent to a TDD configuration of the primary cell. The processing circuitry 520 is configured to determine the control timing configuration to be equivalent to the TDD configuration of the primary cell.

Example operation 46 is further described under at least the subheadings 'HARQ scheduling based on PCell configuration' and 'DL HARQ-ACK timings for cross-carrier scheduling configuration' and FIG. 8.

Example Operation 48

According to some of the example embodiments, the primary cell may be a TDD based cell and the secondary cell may be a FDD based cell. According to some of these example embodiments, the determining 40 may further comprise determining 48 the control timing configuration to be configuration 2 if the configuration number of the primary cell is 0, 1, 2 or 6; or determining 48 the control timing configuration to be 5 if the configuration number of the primary cell is 3, 4 or 5. The processing circuitry 520 is configured to determine the control timing configuration to be configuration 2 if the configuration number of the primary cell is 0, 1, 2 or 6; or configuration 5 is the configuration number of the primary cell is 3, 4 or 5.

Example operation 48 is further described under at least the subheading 'HARQ scheduling based on subframe hierarchy' and FIGS. 9 and 10.

Example Operation 50

According to some of the example embodiments, the primary cell may be a TDD based cell and the secondary cell may be a FDD based cell. According to some of these example embodiments, the determining 40 may further comprise determining 50 the control timing configuration based on a first altered configuration table. The first altered configuration table is provided below:

| UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

The processing circuitry 520 is configured to determine the control timing configuration based on the first alteration configuration table provided above.

Example operation 50 is described further under at least the subheading 'HARQ scheduling based on association sets', Table 3 and FIG. 11.

Example Operation 52

According to some of the example embodiments, the determining 50 may further comprise determining 52 the control timing configuration to be 2* (as provided in the first altered configuration table) if the control timing configuration of the primary cell is 0, 1, 2 or 6; or configuration 5* (as provided in the first altered configuration table) if the control timing configuration of the primary cell is 3, 4 or 5. The processing circuitry 520 is configured to determine the control timing configuration to be 2* (as provided in the first altered configuration table) if the control timing configuration of the primary cell is 0, 1, 2 or 6; or configuration 5* (as provided in the first altered configuration table) if the control timing configuration of the primary cell is 3, 4 or 5.

Example operation 52 is further described under at least the subheading 'HARQ scheduling based on association sets', Table 3 and FIG. 11. It should be appreciated that the choice of configuration 2* and configuration 5* is provided via the subframe hierarchy described under at least the subheading 'HARQ scheduling based on subframe hierarchy' and FIG. 9.

Example Operation 54

According to some of the example embodiments, the determining 50 may further comprise determining 54 the control timing configuration to be 2* if the control timing configuration of the primary cell is 0, 1, 2 or 6; or N* if the control timing configuration of the primary cell is N, where N is an integer with a value of 3-5. The processing circuitry 520 is further configured to determine the control timing configuration to be 2* if the control timing configuration of the primary cell is 0, 1, 2 or 6; or N* if the control timing configuration of the primary cell is N, where N is an integer with a value of 3-5.

Example operation 54 is further described under at least the subheading 'HARQ scheduling based on association sets', Table 3 and FIG. 11. It should be appreciated that the choice of configuration 2* for primary cells with a control timing configuration of 0, 1, 2 or 6 is provided via the subframe hierarchy described under at least the subheading 'HARQ scheduling based on subframe hierarchy' and FIG. 9.

Example Operation 56

According to some of the example embodiments, the primary cell may be a TDD based cell and the secondary cell may be a FDD based cell. According to some of these example embodiments, the determining 40 may further comprise determining 56 the control timing configuration based on a second altered configuration table. The second altered configuration table is provided below:

| UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

The processing circuitry 520 is configured to determine the control timing configuration based on the second altered configuration table provided above.

Example operation 56 is described further under the subheading 'HARQ scheduling based on extended association sets', Tables 4 and 5, and FIGS. 12 and 13.

Example Operation 58

According to some of the example embodiments, the determining 56 further comprises determining 58 the control timing configuration to be 1* (from the second altered configuration table provided in example operation 56) if the control timing configuration of the primary cell is 0, 1 or 6; or N* if the control timing configuration of the primary cell is N, where N is an integer valued from 2-5. The processing circuitry 520 is configured to determine the control timing configuration to be 1* (from the second altered configuration table provided in example operation 56) if the control timing configuration of the primary cell is 0, 1 or 6; or N* if the control timing configuration of the primary cell is N, where N is an integer valued from 2-5.

Example operation 58 is further described under at least the sub-heading 'HARQ scheduling based on extended association sets', Tables 4 and 5, and FIGS. 12 and 13. It should be appreciated that the choice of configuration 1* for primary cells with a control timing configuration of 0, 1, or 6 is provided via the subframe hierarchy described under at least the subheading 'HARQ scheduling based on subframe hierarchy' and FIG. 9.

Example Operation 60

According to some of the example embodiments, the primary cell may be a TDD based cell and the secondary cell may be a FDD based cell. According to some of these example embodiments, the determining 40 may further comprise determining 60 the control timing configuration based on a third altered configuration table. The third altered configuration table is provided below:

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0* | | | 6, 5, 4 | | 4, 5 | | | 6, 5, 4 | | 4, 5 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |
| 6* | | | 7 | 7, 6, 5 | 5 | | | 7, 6, 5, 4 | 7 | |

The processing circuitry 520 is configured to determine the control timing configuration based on the third altered configuration table provided above.

Example operation 60 is further described under at least the subheading 'HARQ scheduling based on extended association sets', Tables 4 and 5, and FIGS. 12 and 13.

Example Operation 62

According to some of the example embodiments, the determining 60 may further comprise determining 62 the control timing configuration to be N* if the control timing configuration of the primary cell is N, where N is an integer valued from 0-6. The processing circuitry 520 is configured to determine the control timing configuration to be N* if the control timing configuration of the primary cell is N, where N is an integer valued from 0-6.

Example operation 62 is further described under at least the subheading 'HARQ scheduling based on extended association sets', Tables 4 and 5, and FIGS. 12 and 13.

Operation 64

The user equipment is also configured to implement 64 the control timing configuration for downlink HARQ-ACK control timing for a cell serving the user equipment. The processing circuitry 520 is configured to implement control timing configuration for downlink HARQ-ACK control timing for a cell serving the user equipment.

It should be noted that although terminology from 3GPP LTE has been used herein to explain the example embodiments, this should not be seen as limiting the scope of the example embodiments to only the aforementioned system. Other wireless systems, comprising HSPA, WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A wireless terminal or user equipment (UE) as the term is used herein, is to be broadly interpreted to comprise a radiotelephone having ability for Internet/intranet access, web browser, organizer, calendar, a camera, e.g., video and/or still image camera, a sound recorder, e.g., a microphone, and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera, e.g., video and/or still image camera, having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

It should further be appreciated that the term dual connectivity should not be limited to a user equipment or wireless terminal being connected to only two base stations. In dual connectivity a wireless terminal may be connected to any number of base stations.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method, in a base station, for determining a control timing configuration, the control timing configuration providing a subframe timing setting for configuring downlink Hybrid Automatic Retransmission Request Acknowledgment (HARQ-ACK) control timing for a cell serving a user equipment in a multiple cell communications network, the user equipment being served by a Time Division Duplex (TDD) based cell, and a Frequency Division Duplex (FDD) based cell, the method comprising:
   determining a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations; and
   the primary cell being the TDD based cell and the secondary cell being the FDD based cell, the determining further comprising determining the control timing configuration based on a first altered configuration table, wherein the first altered configuration table is:

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

2. The method of claim 1, wherein the determining further comprises determining the control timing configuration to be one of:
   2* if the control timing configuration of the primary cell is one of 0, 1, 2 and 6; and
   5* if the control timing configuration of the primary cell is one of 3, 4 and 5.

3. The method of claim 1, wherein the determining further comprises determining the control timing configuration to be one of:
   2* if the control timing configuration of the primary cell is one of 0, 1, 2 and 6; and
   N* if the control timing configuration of the primary cell is N, wherein N is an integer with a value of 3-5.

4. A method, in a base station, for determining a control timing configuration, the control timing configuration providing a subframe timing setting for configuring downlink Hybrid Automatic Retransmission Request Acknowledgment (HARQ-ACK) control timing for a cell serving a user equipment in a multiple cell communications network, the user equipment being served by a Time Division Duplex (TDD) based cell, and a Frequency Division Duplex (FDD) based cell, the method comprising:
   determining a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
   the primary cell being the TDD based cell and the secondary cell being the FDD based cell, the determining further comprising determining the control timing configuration based on a second altered configuration table, wherein the second altered configuration table is:

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | | the control timing configuration being one of:
      1* if the control timing configuration of the primary cell is one of 0, 1, and 6; and
      N* if the control timing configuration of the primary cell is N, wherein N is an integer with a value of 2-5.

5. A method, in a base station, for determining a control timing configuration, the control timing configuration providing a subframe timing setting for configuring downlink Hybrid Automatic Retransmission Request Acknowledgment (HARQ-ACK) control timing for a cell serving a user equipment in a multiple cell communications network, the user equipment being served by a Time Division Duplex (TDD) based cell, and a Frequency Division Duplex (FDD) based cell, the method comprising:
   determining a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
   the primary cell being the TDD based cell and the secondary cell being the FDD based cell, the determining further comprising determining the control timing configuration based on a third altered configuration table, wherein the third altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0* | | | 6, 5, 4 | | 4, 5 | | | 6, 5, 4 | | 4, 5 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |
| 6* | | | 7 | 7, 6, 5 | 5 | | | 7, 6, 5, 4 | 7 | | the control timing configuration being N* if the control timing configuration of the primary cell is N, wherein N is an integer with a value of 0-6.

6. A base station for determining a control timing configuration, the control timing configuration providing a subframe timing setting for configuring downlink Hybrid Automatic Retransmission Request Acknowledgment (HARQ-ACK) control timing for a cell serving a user equipment in a multiple cell communications network, the user equipment being served by a Time Division Duplex (TDD) based cell, and a Frequency Division Duplex (FDD) based cell, the base station comprising:
processing circuitry configured to determine a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
the primary cell being the TDD based cell and the secondary cell being the FDD based cell; and
the processing circuitry is further configured to determine the control timing configuration based on a first altered configuration table, wherein the first altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10. | | | | | | | |

7. The base station of claim 6, wherein the processing circuitry is further configured to determine the control timing configuration to be one of:
2* if the control timing configuration of the primary cell is one of 0, 1, 2 and 6; and
5* if the control timing configuration of the primary cell is one of 3, 4 and 5.

8. The base station of claim 6, wherein the processing circuitry is further configured to determine the control timing configuration to be one of:
2* if the control timing configuration of the primary cell is one of 0, 1, 2 and 6; and
N* if the control timing configuration of the primary cell is N, wherein N is an integer with a value of 3-5.

9. A base station for determining a control timing configuration, the control timing configuration providing a subframe timing setting for configuring downlink Hybrid Automatic Retransmission Request Acknowledgment (HARQ-ACK) control timing for a cell serving a user equipment in a multiple cell communications network, the user equipment being served by a Time Division Duplex (TDD) based cell, and a Frequency Division Duplex (FDD) based cell, the base station comprising:
processing circuitry configured to determine a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
the primary cell being the TDD based cell and the secondary cell being the FDD based cell; and
the processing circuitry is further configured to determine the control timing configuration based on a second altered configuration table, wherein the second altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | | the control timing configuration being one of:
1* if the control timing configuration of the primary cell is one of 0, 1, and 6; and
N* if the control timing configuration of the primary cell is N, wherein N is an integer with a value of 2-5.

10. A base station for determining a control timing configuration, the control timing configuration providing a subframe timing setting for configuring downlink Hybrid Automatic Retransmission Request Acknowledgment (HARQ-ACK) control timing for a cell serving a user equipment in a multiple cell communications network, the user equipment being served by a Time Division Duplex (TDD) based cell, and a Frequency Division Duplex (FDD) based cell, the base station comprising:

processing circuitry configured to determine a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;

the primary cell being the TDD based cell and the secondary cell being the FDD based cell; and the processing circuitry is further configured to determine the control timing configuration based on a third altered configuration table, wherein the third altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0* | | | 6, 5, 4 | | 4, 5 | | | 6, 5, 4 | | 4, 5 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |
| 6* | | | 7 | 7, 6, 5 | 5 | | | 7, 6, 5, 4 | 7 | | the control timing configuration being N* if the control timing configuration of the primary cell is N, wherein N is an integer from 0-6.

11. A method, in a user equipment, for determining a control timing configuration, the control timing configuration providing a subframe timing setting for configuring downlink Hybrid Automatic Retransmission Request Acknowledgment (HARQ-ACK) control timing for a cell serving the user equipment in a multiple cell communications network, the user equipment being served by a Time Division Duplex (TDD) based cell, and a Frequency Division Duplex (FDD) based cell, the method comprising:

determining a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;

the primary cell being the TDD based cell and the secondary cell being the FDD based cell; and the determining further comprising determining the control timing configuration based on a first altered configuration table, wherein the first altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

12. The method of claim 11, wherein the determining further comprises determining the control timing configuration to be one of:

2* if the control timing configuration of the primary cell is one of 0, 1, 2 and 6; and 5* if the control timing configuration of the primary cell is one of 3, 4 and 5.

13. The method of claim 11, wherein the determining further comprises determining the control timing configuration to be one of:

2* if the control timing configuration of the primary cell is one of 0, 1, 2 and 6; and N* if the control timing configuration of the primary cell is N, wherein N is an integer with a value of 3-5.

14. A method, in a user equipment, for determining a control timing configuration, the control timing configuration providing a subframe timing setting for configuring downlink Hybrid Automatic Retransmission Request Acknowledgment (HARQ-ACK) control timing for a cell serving the user equipment in a multiple cell communications network, the user equipment being served by a Time Division Duplex (TDD) based cell, and a Frequency Division Duplex (FDD) based cell, the method comprising:

determining a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;

the primary cell being the TDD based cell and the secondary cell being the FDD based cell; and the determining further comprising determining the control timing configuration based on a second altered configuration table, wherein the second altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | | the control timing configuration being one of:
1* if the control timing configuration of the primary cell is one of 0, 1, and 6; and
N* if the control timing configuration of the primary cell is N, wherein N is an integer with a value of 2-5.

15. A method, in a user equipment, for determining a control timing configuration, the control timing configuration providing a subframe timing setting for configuring downlink Hybrid Automatic Retransmission Request Acknowledgment (HARQ-ACK) control timing for a cell serving the user equipment in a multiple cell communications network, the user equipment being served by a Time Division Duplex (TDD) based cell, and a Frequency Division Duplex (FDD) based cell, the method comprising:
determining a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
the primary cell being the TDD based cell and the secondary cell being the FDD based cell; and
the determining further comprising determining the control timing configuration based on a third altered configuration table, wherein the third altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0* | | | 6, 5, 4 | | 4, 5 | | | 6, 5, 4 | | 4, 5 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 6* | | | 7 | 7, 6, 5 | 5 | | | 7, 6, 5, 4 | 7 | | the control timing configuration being N* if the control timing configuration of the primary cell is N, wherein N is an integer with a value of 0-6.

16. A user equipment for determining a control timing configuration, the control timing configuration providing a subframe timing setting for configuring downlink Hybrid Automatic Retransmission Request Acknowledgment (HARQ-ACK) control timing for a cell serving the user equipment in a multiple cell communications network, the user equipment being served by a Time Division Duplex (TDD) based cell, and a Frequency Division Duplex (FDD) based cell, the user equipment comprising:
processing circuitry configured to determine a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
the processing circuitry further configured to implement the control timing configuration for downlink HARQ-ACK control timing for a cell serving the user equipment;
the primary cell being the TDD based cell and the secondary cell being the FDD based cell; and
the processing circuitry is further configured to determine the control timing configuration based on a first altered configuration table, wherein the first altered configuration table is:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10. | | | | | | | |

17. The user equipment of claim 16, wherein the processing circuitry is further configured to determine the control timing configuration to be one of:
2* if the control timing configuration of the primary cell is one of 0, 1, 2 and 6;
5* if the control timing configuration of the primary cell is 3, 4 and 5.

18. The user equipment of claim 16, wherein the processing circuitry is further configured to determine the control timing configuration to be one of:
   2* if the control timing configuration of the primary cell is one of 0, 1, 2 and 6; and
   N* if the control timing configuration of the primary cell is N, wherein N is an integer with a value of 3-5.

19. A user equipment for determining a control timing configuration, the control timing configuration providing a subframe timing setting for configuring downlink Hybrid Automatic Retransmission Request Acknowledgment (HARQ-ACK) control timing for a cell serving the user equipment in a multiple cell communications network, the user equipment being served by a Time Division Duplex (TDD) based cell, and a Frequency Division Duplex (FDD) based cell, the user equipment comprising:
   processing circuitry configured to determine a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
   the processing circuitry further configured to implement the control timing configuration for downlink HARQ-ACK control timing for a cell serving the user equipment;
   the primary cell being the TDD based cell and the secondary cell being the FDD based cell; and
   the processing circuitry is further configured to determine the control timing configuration based on a second altered configuration table, wherein the second altered configuration table is:

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | | the control timing configuration being one of:
   1* if the control timing configuration of the primary cell is one of 0, 1, and 6; and
   N* if the control timing configuration of the primary cell is N, wherein N is an integer with a value of 2-5.

20. A user equipment for determining a control timing configuration, the control timing configuration providing a subframe timing setting for configuring downlink Hybrid Automatic Retransmission Request Acknowledgment (HARQ-ACK) control timing for a cell serving the user equipment in a multiple cell communications network, the user equipment being served by a Time Division Duplex (TDD) based cell, and a Frequency Division Duplex (FDD) based cell, the user equipment comprising:
   processing circuitry configured to determine a control timing configuration for a secondary cell, the secondary cell being one of the TDD based cell and the FDD based cell, based on a control timing configuration of a primary cell, the primary cell being one of the FDD based cell and the TDD based cell, the control timing configuration of the secondary cell being determined as to reduce a number of downlink (DL) subframes unavailable for DL HARQ feedback for a particular primary cell control timing configuration as compared with other primary cell control timing configurations;
   the processing circuitry further configured to implement the control timing configuration for downlink HARQ-ACK control timing for a cell serving the user equipment;
   the primary cell being the TDD based cell and the secondary cell being the FDD based cell; and
   the processing circuitry is further configured to determine the control timing configuration based on a third altered configuration table, wherein the third altered configuration table is:

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0* | | | 6, 5, 4 | | 4, 5 | | | 6, 5, 4 | | 4, 5 |
| 1* | | | 7, 6, 5, 4 | 4 | | | | 7, 6, 5, 4 | 4 | |
| 2* | | | 8, 7, 4, 6, 5 | | | | | 8, 7, 4, 6, 5 | | |
| 3* | | | 7, 6, 11, 10, 9, 8 | 6, 5 | 5, 4 | | | | | |
| 4* | | | 12, 8, 7, 11, 10, 9 | 6, 5, 4, 7 | | | | | | |
| 5* | | | 13, 12, 9, 8, 7, 5, 4, 11, 6, 10 | | | | | | | |
| 6* | | | 7 | 7, 6, 5 | 5 | | | 7, 6, 5, 4 | 7 | | the control timing configuration being N* if the control timing configuration of the primary cell is N, wherein N is an integer with a value of 0-6.

* * * * *

UNITED STATES PATENT AND TRADEMARK OFFICE
CERTIFICATE OF CORRECTION

PATENT NO. : 10,165,593 B2  
APPLICATION NO. : 15/061510  
DATED : December 25, 2018  
INVENTOR(S) : Daniel Larsson et al.

Page 1 of 1

It is certified that error appears in the above-identified patent and that said Letters Patent is hereby corrected as shown below:

On the Title Page

Item (57), under "ABSTRACT", in Column 2, Line 6, delete "served a" and insert -- served by a --, therefor.

Item (57), under "ABSTRACT", in Column 2, Line 8, delete "user equipment the" and insert -- user equipment for determining the --, therefor.

On Page 2, item (56), under "OTHER PUBLICATIONS", in Column 2, Line 11, delete "Fransisco," and insert -- Francisco, --, therefor.

In the Specification

In Column 1, Line 9, delete "Feb. 18, 2015," and insert -- Feb. 18, 2014, --, therefor.

In Column 1, Line 12, delete "TIMING," and insert -- TIMING, now Pat. No. 9,319,211, --, therefor.

In Column 1, Line 16, delete "which each" and insert -- which --, therefor.

In Column 1, Line 27, delete "network" and insert -- network. --, therefor.

Signed and Sealed this  
Fourteenth Day of January, 2020

Andrei Iancu  
*Director of the United States Patent and Trademark Office*